US012138649B2

(12) United States Patent
Li et al.

(10) Patent No.: US 12,138,649 B2
(45) Date of Patent: Nov. 12, 2024

(54) ELECTROSTATIC NOZZLE AND MINIMAL QUANTITY LUBRICATING AND GRINDING SYSTEM FOR CONTROLLABLE JET

(71) Applicants: QINGDAO UNIVERSITY OF TECHNOLOGY, Shandong (CN); INNER MONGOLIA UNIVERSITY FOR NATIONALITIES, Inner Mongolia (CN)

(72) Inventors: Changhe Li, Qingdao (CN); Dongzhou Jia, Qingdao (CN); Huajun Cao, Qingdao (CN); Xuefeng Xu, Qingdao (CN); Zhiguang Han, Qingdao (CN); Naiqing Zhang, Qingdao (CN); Huayang Zhao, Qingdao (CN); Min Yang, Qingdao (CN); Yanbin Zhang, Qingdao (CN); Xiaoming Wang, Qingdao (CN); Runze Li, Qingdao (CN); Teng Gao, Qingdao (CN); Wentao Wu, Qingdao (CN); Xin Cui, Qingdao (CN); Yali Hou, Qingdao (CN)

(73) Assignees: QINGDAO UNIVERSITY OF TECHNOLOGY, Shandong (CN); INNER MONGOLIA UNIVERSITY FOR NATIONALITIES, Inner Mongolia (CN)

( * ) Notice: Subject to any disclaimer, the term of this patent is extended or adjusted under 35 U.S.C. 154(b) by 1141 days.

(21) Appl. No.: 16/965,658

(22) PCT Filed: Feb. 6, 2020

(86) PCT No.: PCT/CN2020/074386
§ 371 (c)(1),
(2) Date: Jul. 29, 2020

(87) PCT Pub. No.: WO2020/177504
PCT Pub. Date: Sep. 10, 2020

(65) Prior Publication Data
US 2021/0229238 A1  Jul. 29, 2021

(30) Foreign Application Priority Data

Mar. 5, 2019  (CN) .......................... 201910164150.9

(51) Int. Cl.
*B05B 5/03* (2006.01)
*B05B 5/025* (2006.01)
(Continued)

(52) U.S. Cl.
CPC .............. *B05B 5/03* (2013.01); *B05B 5/0255* (2013.01); *B05B 5/043* (2013.01); *B05B 5/1608* (2013.01); *B24B 55/02* (2013.01); *B05B 5/0533* (2013.01)

(58) Field of Classification Search
CPC ........... B05B 5/00; B05B 5/03; B05B 5/0255; B05B 5/043; B05B 5/1608; B05B 5/0533;
(Continued)

(56) References Cited

U.S. PATENT DOCUMENTS

| 3,556,255 A | 1/1971 | Lomax |
| 5,176,321 A | 1/1993 | Doherty |
| 2015/0126097 A1* | 5/2015 | Li ............................. B05B 7/10 |
| | | 451/450 |

FOREIGN PATENT DOCUMENTS

| CN | 103072084 A | 5/2013 |
| CN | 103084919 A | 5/2013 |

(Continued)

OTHER PUBLICATIONS

Machine translation of CN-105108651-A (Year: 2015).*
(Continued)

*Primary Examiner* — Robert F Neibaur
(74) *Attorney, Agent, or Firm* — True Shepherd LLC; Andrew C. Cheng

(57) ABSTRACT

An electrostatic nozzle and a minimal quantity lubricating and grinding system for a controllable jet. An electrostatic nozzle includes a nozzle core, an upper nozzle body being connected above the nozzle core; an empty space being formed between the upper nozzle body and the nozzle core for storing compressed air and decompression; a lower
(Continued)

nozzle body being connected below the nozzle core; a gas-liquid mixing chamber, an acceleration chamber, and a nozzle outlet being sequentially disposed inside the nozzle core from top to bottom; and micro-convex bodies being evenly arranged on an inner wall of the acceleration chamber.

7 Claims, 7 Drawing Sheets

(51) Int. Cl.
 *B05B 5/043* (2006.01)
 *B05B 5/053* (2006.01)
 *B05B 5/16* (2006.01)
 *B24B 55/02* (2006.01)
(58) Field of Classification Search
 CPC ..... B05B 15/20; B24B 55/02; B24B 1257/02; B24C 3/22; B24C 5/04; B23Q 11/1076; B23Q 11/10; B23Q 11/1084; B23Q 11/126
 USPC ...... 239/690–708; 451/36, 60, 99, 102, 449, 451/488
 See application file for complete search history.

(56) References Cited

FOREIGN PATENT DOCUMENTS

| | | | | |
|---|---|---|---|---|
| CN | 105108651 A | * | 12/2015 | ............... B08B 3/02 |
| CN | 105451889 A | | 3/2016 | |
| CN | 105479254 A | | 4/2016 | |
| CN | 108161750 A | | 6/2018 | |
| CN | 108214090 A | | 6/2018 | |
| CN | 109759958 A | | 5/2019 | |
| CN | 209615205 U | | 11/2019 | |
| FR | 2 950 545 B1 | | 11/2012 | |
| KR | 20070093829 A | * | 9/2007 | ............... B41J 2/162 |
| WO | 2017/179972 A1 | | 10/2017 | |

OTHER PUBLICATIONS

Machine translation of KR-20070093829-A (Year: 2007).*
May 12, 2020 International Search Report issued in International Patent Application No. PCT/CN2020/074386.
Mar. 12, 2020 Written Opinion issued in International Patent Application No. PCT/CN2020/074386.

* cited by examiner

ELECTROSTATIC NOZZLE AND MINIMAL QUANTITY LUBRICATING AND GRINDING SYSTEM FOR CONTROLLABLE JET

BACKGROUND

Technical Field

The present disclosure pertains to the field of grinding liquid supply devices in mechanical processing, and in particular, to an electrostatic nozzle and a minimal quantity lubricating and grinding system for a controllable jet.

Related Art

The description in this section merely provides background information related to the present disclosure and does not necessarily constitute the prior art.

A minimal quantity lubrication (MQL) technology is specifically to mix and atomize a minimal amount of grinding liquid and compressed air with a specified pressure and then spray the mixture to a grinding area, to effectively lubricate grindings, grinding wheels, and processed surfaces. This technology minimizes the use of grinding liquid (approximately a few thousandths of the amount in a traditional pouring lubrication method) while ensuring effective lubrication and cooling effects, thereby reducing production costs and environmental pollution as well as damages to human bodies.

Nano-jet minimal quantity lubrication is based on an enhanced heat transfer theory. From the enhanced heat transfer theory, a heat transfer capability of solid is much greater than that of liquid and gas. At room temperature, a thermal conductivity coefficient of solid materials is several orders of magnitude greater than that of fluid materials. Addition of solid particles in a minimal quantity lubrication medium can significantly increase a thermal conductivity coefficient of a fluid medium, increase a convection heat transfer capability, and greatly increase a cooling capability of minimal quantity lubrication. In addition, nano particles also have special tribological properties such as abrasion resistance, friction reduction, and high loading in terms of lubrication and tribology. During nano-jet minimal quantity lubrication, nano-scale solid particles are added to a minimal quantity lubrication fluid medium to make nano fluid, that is, nano particles, lubricants (oil or an oil-water mixture), and high-pressure gas are mixed and atomized and then sprayed to a grinding area in the form of a jet.

Droplets generated by the nano-fluid minimal quantity lubrication technology rely on the high-pressure gas to enter the grinding area to function in cooling and lubrication. However, a motion path of the droplets is not controllable, and droplet diffusion and drift occur. Diffusion of the droplets into a working environment not only pollutes the environment but also threatens the health of an operator, reducing the effective utilization of grinding liquid and resulting in the waste of resources. Nowadays, the influence of lubrication liquid and cooling liquid on the health of the operator during minimal quantity lubrication machining is being highly concerned. For example, the operator suffers from a variety of respiratory diseases including occupational asthma, allergic pneumonia, and loss of lung function and skin diseases such as allergies, oil acne, and skin cancer. In order to resolve this problem in reality, researchers have proposed electrostatic atomization minimal quantity lubrication through enormous experiment, to further improve the atomization effect while achieving controllable delivery of atomized droplets under the action of an electric field force.

The patent with the Application No. 201310042095.9 discloses a nano-fluid minimal quantity lubricating and grinding system for electrostatic atomization of a controllable jet. In this scheme, a corona charging technology is adopted to charge minimal quantity lubrication liquid at a nozzle outlet, and droplets are further crushed under the action of a high-voltage electric field, so that small droplets formed through the crushing are delivered to a grinding area in a controllable manner along a direction of an electric field line, thereby effectively cooling and lubricating the grinding area. The patent with the Application No. 201310050221.5 discloses a minimal quantity lubricating method for atomization of cutting fluid. The scheme also adopts a corona discharge principle to crush and delivery lubrication liquid.

The inventor found from the currently published literature that, there are not many technologies that adopt electrostatic atomization for lubrication in the mechanical processing field, and the technology is not mature. At present, charge delivery of lubricating oil mostly adopts corona discharge (discharge at an electrode tip), but corona discharge has the problems of a small corona area and a low charge rate, resulting in the waste of energy which increasing the used voltage. Contact charging (a high-voltage power supply is directly in contact with a nozzle) can effectively increase an amount of charge of lubrication liquid, but there is also a risk of leakage. Currently, there is no minimal quantity lubrication equipment suitable for contact charging in the market. Facts show that when contact charging is adopted, minimal quantity lubrication liquid at a nozzle outlet is stretched into a plurality of small liquid columns under the action of external forces such as compressed air and an electric field force and then the small liquid columns are crushed into small droplets. In this process, diameters of the liquid columns are extremely non-uniform, leading to more dispersed particle size distribution of the subsequently formed small droplets, which is not conducive to the control of droplet particle sizes. In addition, the small liquid columns at the nozzle outlet fluctuate greatly under the action of turbulent flows formed by the compressed air, which is very unfavorable for the control of subsequent delivery paths of the droplets.

In addition to the foregoing problems, the inventor also found that due to a high pressure of the compressed air, there is noise when the droplets are ejected from the nozzle, and the noise affects hearing health of the operator. Moreover, during the use of the minimal quantity lubricating and grinding system, due to strong adsorption performance of nano particles, pipelines for delivering nano fluid often become clogged, greatly affecting the use performance. This is a problem that needs to be urgently resolved in the minimal quantity lubricating and grinding system for electrostatic atomization.

SUMMARY

A first aspect of the present disclosure provides a micro-textured electrostatic nozzle, and a plurality of micro-convex bodies are disposed on an inner surface of an acceleration chamber, greatly increasing the lipophilic performance of the inner surface of the acceleration chamber.

A technical solution of the micro-textured electrostatic nozzle in the first aspect of the present disclosure is as follows:

The micro-textured electrostatic nozzle includes: a nozzle core, an upper nozzle body being connected above the nozzle core; an empty space being formed between the upper nozzle body and the nozzle core for storing compressed air and decompression; a lower nozzle body being connected below the nozzle core; a gas-liquid mixing chamber, an acceleration chamber, and a nozzle outlet being sequentially disposed inside the nozzle core from top to bottom; and micro-convex bodies being evenly arranged on an inner wall of the acceleration chamber.

A second aspect of the present disclosure provides a dual-level composite micro-textured electrostatic nozzle, and a plurality of micro-convex bodies are disposed on an inner surface of an acceleration chamber. The micro-convex body is a dual-level composite structure composed of a primary micro-convex body and a secondary micro-convex body. The composite micro-convex body undoubtedly increases the lipophilic performance of the inner surface of the acceleration chamber compared with a separate micro-convex body structure.

A technical solution of the dual-level composite micro-textured electrostatic nozzle in the second aspect of the present disclosure is as follows:

The dual-level composite micro-textured electrostatic nozzle includes: a nozzle core, an upper nozzle body being connected above the nozzle core; an empty space being formed between the upper nozzle body and the nozzle core for storing compressed air and decompression; a lower nozzle body being connected below the nozzle core; a gas-liquid mixing chamber, an acceleration chamber, and a nozzle outlet being sequentially disposed inside the nozzle core from top to bottom; and micro-convex bodies being evenly arranged on an inner wall of the acceleration chamber, the micro-convex bodies including a primary micro-convex body and a secondary micro-convex body, the secondary micro-convex body being disposed on the primary micro-convex body.

A third aspect of the present disclosure provides an electrostatic nozzle for noise reduction and resistance enhancement, and a plurality of tapered strip-shaped micro-convex bodies are disposed on an inner surface of an acceleration chamber. A tapered strip groove formed between the tapered strip-shaped micro-convex bodies can effectively reduce noise and reduce damages to hearing health of an operator. The plurality of micro-convex bodies disposed on the inner surface of the acceleration chamber also greatly increase a contact area between a nozzle core and minimal quantity lubrication liquid.

A technical solution of the electrostatic nozzle for noise reduction and resistance enhancement in the third aspect of the present disclosure is as follows:

The electrostatic nozzle for noise reduction and resistance enhancement includes: a nozzle core, an upper nozzle body being connected above the nozzle core; an empty space being formed between the upper nozzle body and the nozzle core for storing compressed air and decompression; a lower nozzle body being connected below the nozzle core; a gas-liquid mixing chamber, an acceleration chamber, and a nozzle outlet being sequentially disposed inside the nozzle core from top to bottom; and micro-convex bodies being evenly arranged on an inner wall of the acceleration chamber, the micro-convex body being in the shape of a tapered strip, and a tapered strip groove being formed between any two tapered strip-shaped micro-convex bodies.

A fourth aspect of the present disclosure provides a contact-type electrostatic nozzle with a gradient micro-convex body, and a plurality of transitional non-equal-height micro-convex bodies are disposed on an inner surface of an acceleration chamber. The structure of the transitional micro-convex body can cause motion resistance of minimal quantity lubrication liquid to be distributed in descending order in the acceleration chamber, helping to form a uniform oil film under the pulling action of compressed air, and greatly reducing disturbance of the jet and improving the uniformity of the liquid line of the liquid film, thereby causing finally formed droplets to be distributed more evenly and motion paths thereof to be more controllable.

A technical solution of the contact-type electrostatic nozzle with a gradient micro-convex body in the fourth aspect of the present disclosure is as follows:

The contact-type electrostatic nozzle with a gradient micro-convex body includes: a nozzle core, an upper nozzle body being connected above the nozzle core; an empty space being formed between the upper nozzle body and the nozzle core for storing compressed air and decompression; a lower nozzle body being connected below the nozzle core; a gas-liquid mixing chamber, an acceleration chamber, and a nozzle outlet being sequentially disposed inside the nozzle core from top to bottom; and micro-convex bodies being evenly arranged on an inner wall of the acceleration chamber, and the micro-convex body being in a transitional non-equal-height structure, that is, a height of the micro-convex body gradually decreasing along a jet motion direction.

A fifth aspect of the present disclosure provides a minimal quantity lubricating and grinding system for a controllable jet, including an electrostatic nozzle. The electrostatic nozzle is used to charge lubrication liquid to improve a charge rate and uniformity of droplets while achieving controllable distribution of mist droplets.

A technical solution of the minimal quantity lubricating and grinding system for a controllable jet in the fifth aspect of the present disclosure is as follows:

In one or more embodiments, the minimal quantity lubricating and grinding system for a controllable jet includes the foregoing micro-textured electrostatic nozzle.

In one or more embodiments, the minimal quantity lubricating and grinding system for a controllable jet includes the foregoing dual-level composite micro-textured electrostatic nozzle.

In one or more embodiments, the minimal quantity lubricating and grinding system for a controllable jet includes the foregoing electrostatic nozzle for noise reduction and resistance enhancement.

In one or more embodiments, the minimal quantity lubricating and grinding system for a controllable jet includes the foregoing contact-type electrostatic nozzle with a gradient micro-convex body.

Beneficial effects of the present disclosure are as follows:

(1) According to the micro-textured electrostatic nozzle in the present disclosure, a plurality of micro-convex bodies are disposed on an inner surface of an acceleration chamber, greatly increasing the lipophilic performance of the inner surface of the acceleration chamber. The lipophilic performance of the inner surface of the acceleration chamber can effectively absorb the minimal quantity lubrication liquid flowing out of the mixing chamber, to increase motion resistance of the minimal quantity lubrication liquid and form a uniform oil film under the pulling action of compressed air, greatly reducing disturbance of the jet and improving uniformity of the liquid line of the liquid film, thereby causing finally formed droplets to be distributed more uniformly and motion path thereof to be more controllable. The plurality of micro-convex bodies disposed on the inner surface of the acceleration chamber also greatly increase a contact area between the nozzle core and the minimal quantity lubrication liquid. Because of the better lipophilicity of the inner surface, time of contact between the minimal quantity lubrication liquid and the inner surface is greatly increased, providing more ideal charging performance.

(2) According to the dual-level composite micro-textured electrostatic nozzle in the present disclosure, a plurality of micro-convex bodies are disposed on an inner surface of an acceleration chamber. The micro-convex body is a dual-level composite structure composed of a primary micro-convex body and a secondary micro-convex body. The composite micro-convex body undoubtedly increases the lipophilic performance of the inner surface of the acceleration chamber compared with a separate micro-convex body structure. The lipophilic performance of the inner surface of the acceleration chamber can effectively absorb the minimal quantity lubrication liquid flowing out of the mixing chamber, to increase motion resistance of the minimal quantity lubrication liquid and form a uniform oil film under the pulling action of compressed air, greatly reducing disturbance of the jet and improving uniformity of the liquid line of the liquid film, thereby causing finally formed droplets to be distributed more uniformly and motion path thereof to be more controllable. A plurality of dual-level composite micro-convex bodies disposed on the inner surface of the acceleration chamber also greatly increase a contact area between the nozzle core and the minimal quantity lubrication liquid. Because of the better lipophilicity of the inner surface, time of contact between the minimal quantity lubrication liquid and the inner surface is greatly increased, providing better charging performance.

(3) According to the electrostatic nozzle for noise reduction and resistance enhancement in the present disclosure, a plurality of tapered strip-shaped micro-convex bodies are disposed on an inner surface of an acceleration chamber greatly increasing the lipophilic performance of the inner surface of the acceleration chamber. The lipophilic performance of the inner surface of the acceleration chamber can effectively absorb the minimal quantity lubrication liquid flowing out of the mixing chamber, to increase motion resistance of the minimal quantity lubrication liquid and form a uniform oil film under the pulling action of compressed air, greatly reducing disturbance of the jet and improving uniformity of the liquid line of the liquid film, thereby further causing finally formed droplets to be distributed more uniformly and motion paths thereof to be more controllable. In addition, the tapered grooves formed between the tapered strip-shaped micro-convex bodies can effectively reduce noise and reduce damages to hearing health of an operator. The plurality of micro-convex bodies disposed on the inner surface of the acceleration chamber also greatly increase a contact area between the nozzle core and the minimal quantity lubrication liquid. Because of the better lipophilicity of the inner surface, time of contact between the minimal quantity lubrication liquid and the inner surface is greatly increased, providing more ideal charging performance.

(4) According to the contact-type electrostatic nozzle with a gradient micro-convex body in the present disclosure, a plurality of transitional non-equal-height micro-convex bodies are disposed on an inner surface of an acceleration chamber. The structure of the transitional micro-convex body can cause motion resistance of minimal quantity lubrication liquid to be distributed in descending order in the acceleration chamber, helping to form a uniform oil film under the pulling action of compressed air, and greatly reducing disturbance of the jet and improving the uniformity of the liquid line of the liquid film, thereby causing finally formed droplets to be distributed more evenly and motion paths thereof to be more controllable. The plurality of micro-convex bodies disposed on the inner surface of the acceleration chamber also greatly increase a contact area between the nozzle core and the minimal quantity lubrication liquid. Because of the better lipophilicity of the inner surface, time of contact between the minimal quantity lubrication liquid and the inner surface is greatly increased, providing more ideal charging performance.

(5) According to the minimal quantity lubricating and grinding system for a controllable jet, the electrostatic nozzle greatly increase time of contact between the minimal quantity lubrication liquid and the electrostatic nozzle. In addition, a hydrophobic and oleophobic carbon-nano coating is coated inside an insulating oil pipe. Because adsorbed gas molecules can exist stably on a nano-size lower concave surface, there is a stable gas film on a macro surface, so that neither oil nor water can be directly in contact with a surface of materials. Therefore, the surface of the materials exhibits an extraordinary double-phobic (oleophobic and hydrophobic) property, so that the problem of clogged oil pipes can be effectively avoided.

BRIEF DESCRIPTION OF THE DRAWINGS

The accompanying drawings constituting a part of the present disclosure are used for providing further understanding for the present disclosure. Exemplary embodiments of the present disclosure and descriptions thereof are used for explaining the present disclosure and do not constitute an improper limitation to the present disclosure.

FIG. 1(*a*) shows a cylindrical nozzle according to an embodiment of the present disclosure.

FIG. 1(*b*) shows a conical nozzle according to an embodiment of the present disclosure.

FIG. 1(*c*) shows a tapered cylindrical nozzle according to an embodiment of the present disclosure.

FIG. 1(*d*) shows a tapered cylindrical diverging nozzle according to an embodiment of the present disclosure.

FIG. 2 is a cross-sectional view of an overall assembly of an electrostatic nozzle according to an embodiment of the present disclosure.

FIG. 3 is a cross-sectional view of a rotating air hole of a nozzle according to an embodiment of the present disclosure.

FIG. 4 is a schematic structural diagram of a mixing chamber cover according to an embodiment of the present disclosure.

FIG. 5(*a*) is a schematic diagram of expanded micro-textured distribution on an inner surface of an acceleration chamber of a micro-textured electrostatic nozzle according to an embodiment of the present disclosure.

FIG. 5(*b*) is a schematic diagram of expanded micro-textured distribution on an inner surface of an acceleration chamber of a micro-textured electrostatic nozzle according to an embodiment of the present disclosure.

FIG. 6 is a schematic structural diagram of expanded micro-textured distribution on an inner surface of an acceleration chamber of a micro-textured electrostatic nozzle per unit area according to an embodiment of the present disclosure.

FIG. 7(*a*) is a schematic diagram of expanded micro-textured distribution on an inner surface of an acceleration chamber of a dual-level composite micro-textured electrostatic nozzle according to an embodiment of the present disclosure.

FIG. 7(b) is a schematic diagram of expanded micro-textured distribution on an inner surface of an acceleration chamber of a dual-level composite micro-textured electrostatic nozzle according to an embodiment of the present disclosure.

1. Grinding machine workbench; 2. Insulating plate; 3. Workpiece; 4. Grinding wheel; 5. Grinding wheel cover; 6. Magnetic chuck; 7. Minimal quantity lubrication liquid delivery pipe; 8. High-voltage DC wire; 9. Adjustable high-voltage DC power supply; 10. Electrostatic nozzle; 11. Casing; 12. Insulating oil cup connector; 13. Insulating oil cup; 14. Insulating fixing bolt; 15. Insulating gasket; 16. Insulating connecting bolt; 17. Minimal quantity pump fixing plate; 18. Precision minimal quantity lubrication pump; 19. Air flow adjusting knob; 20. Insulating tee saddle joint; 21. Solenoid valve; 22. Filter pressure regulating valve; 23. Air source connector; 24. Bidirectional connector; 25. Pulse controller; 26. Air pipe I; 27. Air pipe II; 28. Air pipe III; 29. Liquid flow adjusting knob; 30. Gas-liquid outlet connector; 31. Solenoid valve mounting bracket; 32. Lubrication pump inlet port I; 33. Lubrication pump inlet port II; 34. Minimal quantity lubrication liquid delivery pipe outlet; 35. Oil cup cover; 36. Casing cover; 37. Insulating hose; 38. Insulating oil pipe; 39. Gas delivery cavity; 40. Hydrophobic and oleophobic carbon-nano coating; 41. Liquid delivery cavity; 42. Upper nozzle body; 43. Lower nozzle body; 44. Insulating seal ring; 45. Nozzle core; 46. Annular check ring; 47. Minimal quantity lubrication liquid delivery pipe port; 48. Air storage chamber; 49. Rotating air hole; 50. Gas-liquid mixing chamber; 51. Acceleration chamber; 52. Nozzle outlet; 53. High-voltage wire port; 54. Outgoing high-voltage wire through hole; 55. Check ring placement groove; 56. $V_2O_5$ nanofiber sheet; 57. Micro-convex body; 58. Workpiece power-on device; 59. Insulating housing; 60. Briquetted iron; 61. Permanent magnet; 62. Cotter pin slot; 63. Connecting ring; 64. Compression spring; 65. Primary micro-convex body; 66. Secondary micro-convex body.

DETAILED DESCRIPTION

It should be noted that the following detailed descriptions are all exemplary and are intended to provide a further understanding of the present disclosure. Unless otherwise specified, all technical and scientific terms used herein have the same meaning as commonly understood by those of ordinary skill in the art to which the present disclosure belongs.

It should be noted that terms used herein are only for describing specific implementations and are not intended to limit exemplary implementations according to the present disclosure. As used herein, the singular form is intended to include the plural form, unless the context clearly indicates otherwise. In addition, it should further be understood that terms "comprise" and/or "include" used in this specification indicate that there are features, steps, operations, devices, components, and/or combinations thereof.

Embodiment 1

Figures 1A, 1B, 1C, 1D:
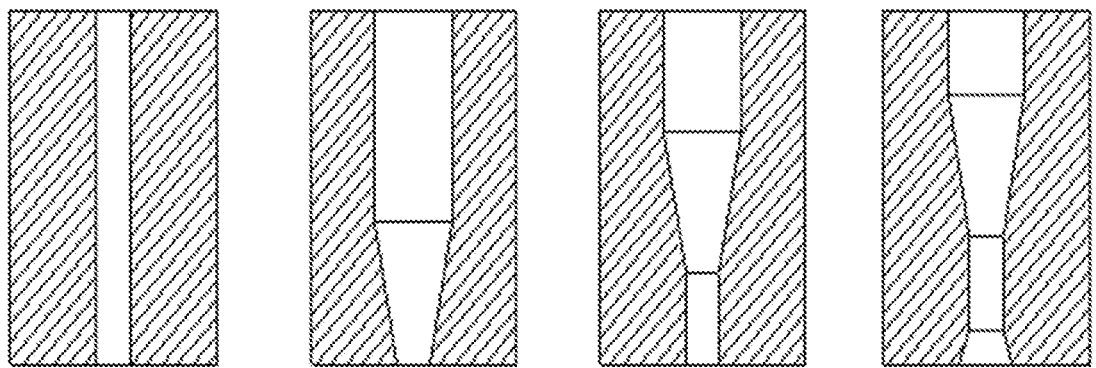

As shown in FIG. 1(a) to FIG. 1(d), a current jet nozzle structure is a cylindrical nozzle as shown in FIG. 1(a), a tapered nozzle as shown in FIG. 1(b), a tapered cylindrical nozzle as shown in FIG. 1(c), and a tapered cylindrical diverging nozzle as shown in FIG. 1(d). The nozzle has relative high requirements on jet velocity distribution and turbulence intensity. The nozzle is designed to have a relatively uniform jet velocity, a non-excessively large velocity gradient, small jet turbulence intensity, and a non-excessively large jet fluctuation, a uniformly distributed drop concentration at an outlet of a nozzle, and a non-excessively large jet concentration gradient. According to research experience of related workers, under same inlet and outlet conditions, in terms of velocity distribution, a velocity of an outlet of the cylindrical nozzle is distributed most non-uniformly, distribution of a central velocity is greatly different from distribution of a boundary velocity, and a velocity of an outlet of the tapered cylindrical diverging nozzle is distributed most uniformly, and a velocity of the tapered cylindrical nozzle is distributed strong than a velocity of the tapered nozzle. In terms of turbulence intensity, the tapered cylindrical diverging nozzle has the strongest turbulence intensity, and the tapered cylindrical nozzle has a turbulence intensity between that of the cylindrical nozzle and that of the tapered nozzle. In terms of distribution of a liquid drop concentration at the nozzle outlet, distribution at an outlet of the tapered cylindrical nozzle is most uniform.

Based on the foregoing analysis, it is believed that the velocity of the outlet of the tapered cylindrical nozzle is distributed relatively uniformly, distribution of the turbulence intensity of the outlet is relatively small, and the liquid drop concentration at the outlet is distributed mostly uniformly. Therefore, according to requirements of jet characteristics, the tapered cylindrical nozzle, that is, the type of nozzle shown in FIG. 1(c), is used in this embodiment.

Figure 2:
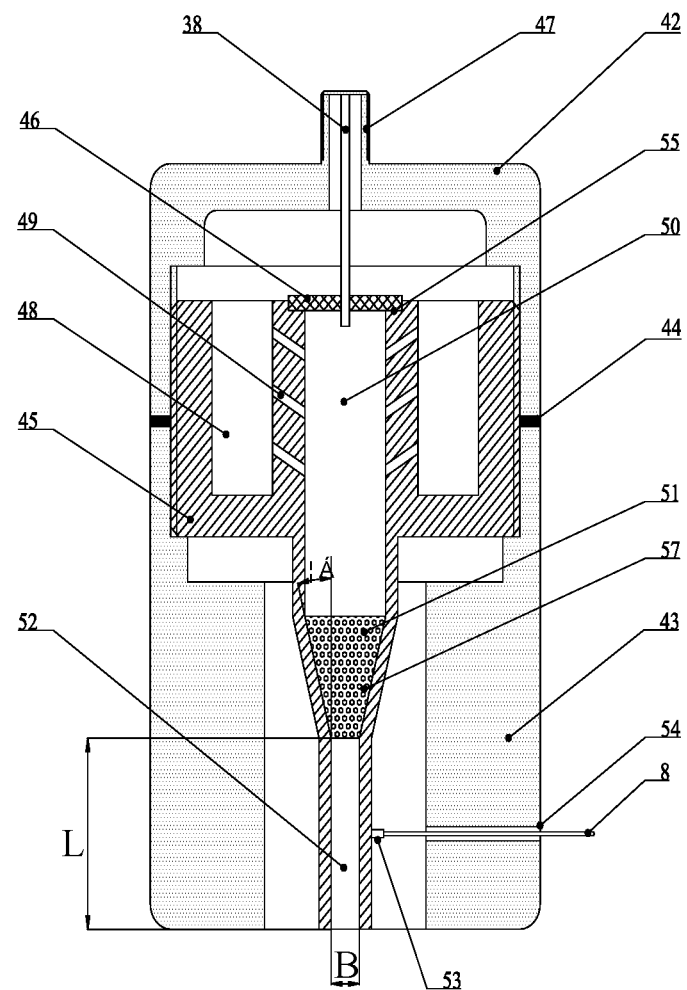
Figure 3:
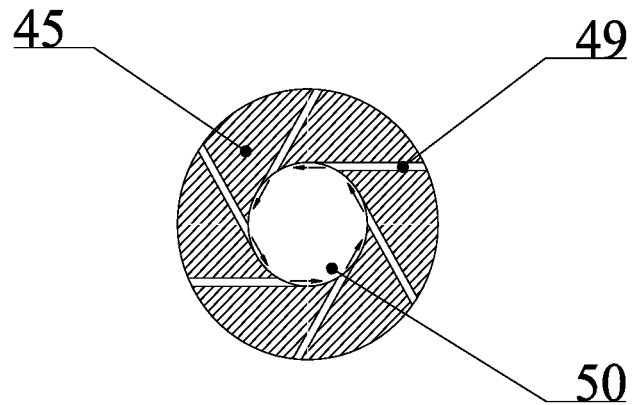
Figure 4:
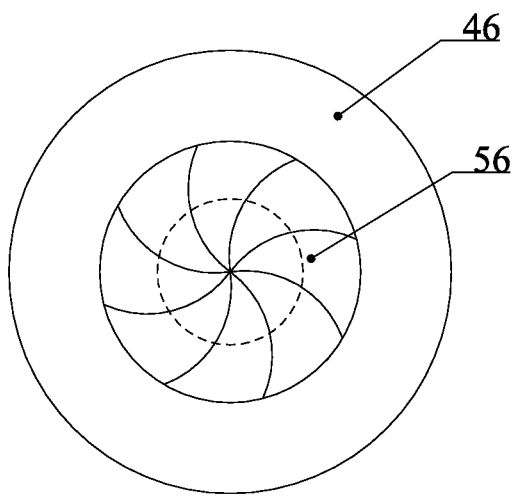

As shown in FIG. 2, FIG. 3, and FIG. 4, a micro-textured electrostatic nozzle in this embodiment includes: an upper nozzle body 42, a lower nozzle body 43, an insulating seal ring 44, a nozzle core 45, an annular check ring 46, a minimal quantity lubrication liquid delivery pipe port 47, an air storage chamber 48, a rotating air hole 49, a gas-liquid mixing chamber 50, an acceleration chamber 51, a nozzle outlet 52, a high-voltage wire port 53, an outgoing high-voltage wire through hole 54, a check ring placement groove 55, a $V_2O_5$ nanofiber sheet 56, and a micro-convex body 57.

The upper nozzle body 42 is connected to an upper part through threads, the lower nozzle body 43 is connected to a lower part of the nozzle core 45 through threads. An insulating seal ring 44 is disposed between the upper nozzle body 42 and the lower nozzle body 43 to effectively prevent gas within the nozzle from leaking. The upper nozzle body 42 and the lower nozzle body 43 are made of an insulating material, and the nozzle core 45 is made of a metal conductive material. The minimal quantity lubrication liquid delivery pipe port 47 is disposed above the upper nozzle body 42, and the minimal quantity lubrication liquid delivery pipe port 47 may be connected to an insulating hose 37 through threads. Therefore, compressed air flowing through the insulating hose 37 may enter the electrostatic nozzle. The air storage chamber 48 is disposed in the nozzle core 45. The air storage chamber 48 functions to store the compressed air and decompress. Similarly, an empty space formed between the upper nozzle body 42 and the nozzle core 45 also plays a same role. The gas-liquid mixing chamber 50, the acceleration chamber 51, and the nozzle outlet 52 are sequentially disposed inside the nozzle core 45 from top to bottom. A contraction angle α of the acceleration chamber 51 is between 5-20°, a diameter of the nozzle outlet is B and a length thereof is L, and a value of L/B is between 2 and 6. In this embodiment, α is 13°, B is 1 mm, and L/B is 4.

The check ring placement groove 55 is disposed above the nozzle core 45, and the annular check ring 46 is fixedly bonded in the check ring placement groove 55. The annular check ring 46 is an elastic insulating annular rubber ring, and 4 to 10 pieces of $V_2O_5$ nanofiber sheets 56 are arranged in an array on the annular check ring 46, for example, 8 pieces in FIG. 3. The $V_2O_5$ nanofiber sheets 56 are bonded surround the annular check ring 46 to cover an annular center hole. An insulating oil pipe 38 passes through the center of a plurality of $V_2O_5$ nanofiber sheets 56 into the gas-liquid mixing chamber 50. The $V_2O_5$ nanofiber sheets 56 have a special property and may perform strong and reversible muscle-like contraction under an action of an external electric field, so as to tightly enclose the insulating oil pipe 38, preventing backflow of airflow and lubrication liquid caused by airflow in the gas-liquid mixing chamber 50. The annular check ring 46 has certain elasticity. Elastic deformation of the annular check ring may offset an amount of the contraction of the $V_2O_5$ nanofiber sheets 56. A rotating air hole 49 is disposed on the nozzle core 45. Rotating air holes 49 are arranged in an array along an outer wall of the gas-liquid mixing chamber 50. An inlet axis is tangent to a wall surface of an inner cavity of the gas-liquid mixing chamber 50. Compressed air flows through the rotating air hole 49 to enter the gas-liquid mixing chamber 50 at a tangential velocity v. The compressed air enters the gas-liquid mixing chamber 50 through a plurality of rotating air holes 49, and a velocity direction of the compressed air does not intersect with an axial center thereof. Therefore, a momentum moment exists for the incoming airflow corresponding to the axial center, promoting the airflow in the gas-liquid mixing chamber 50 to rotate around the axial center while advancing toward the nozzle outlet, thereby driving nanofluid to rotate to form a vortex flow. Formation of the vortex flow causes the minimal quantity lubrication liquid to be fully mixed with the compressed air, and also leads to formation of turbulent flow. The acceleration chamber 51 and the nozzle outlet 52 are mainly configured to accelerate a jet and spread the lubrication liquid in the nozzle. The lubrication liquid is usually pulled into a liquid film or a liquid line in the nozzle and at the outlet, and finally broken into droplets under the action of external forces such as an aerodynamic force and an electrostatic force. A high-voltage wire port 53 is disposed on the nozzle core 45, and an outgoing high-voltage wire through hole 54 is disposed on the lower nozzle body 43. A high-voltage DC wire 8 may be connected to the high-voltage wire port 53 through the outgoing high-voltage wire through hole 54, thereby supplying power to the nozzle core 45. A plurality of micro-convex bodies 57 are disposed on the inner wall of the acceleration chamber 51. A shape and a position of the micro-convex bodies 57 are shown in FIG. 6.

Figure 5A:
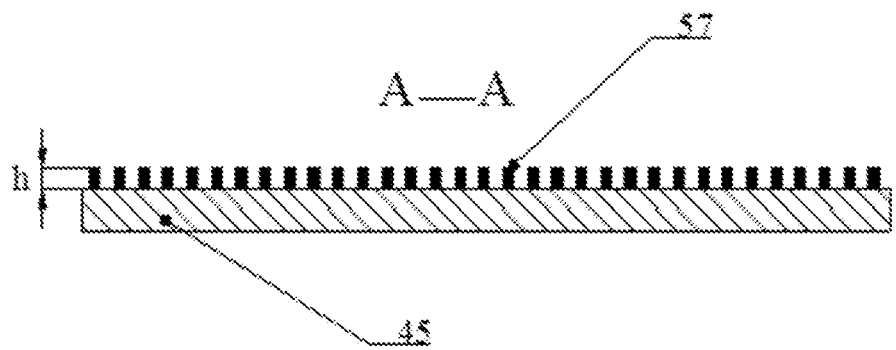
Figure 5B:
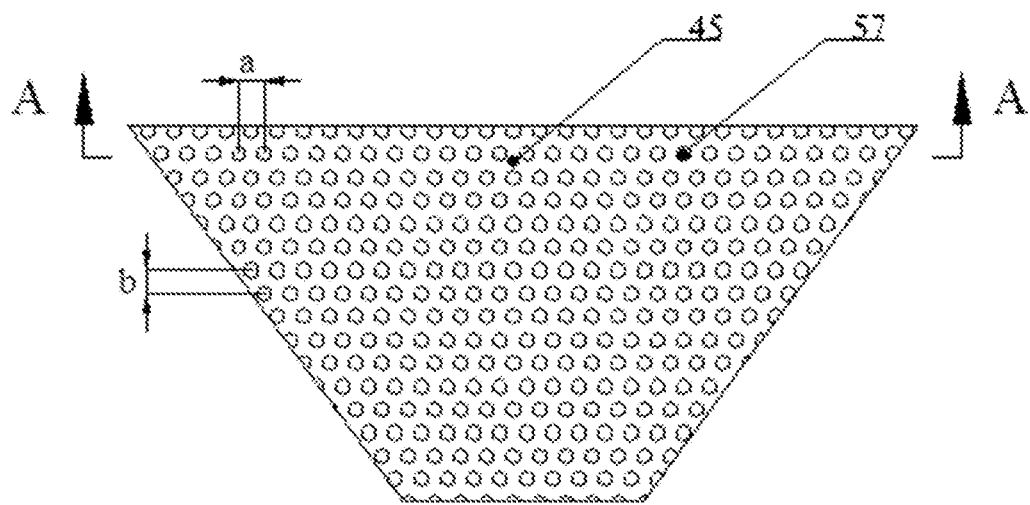
Figure 6:
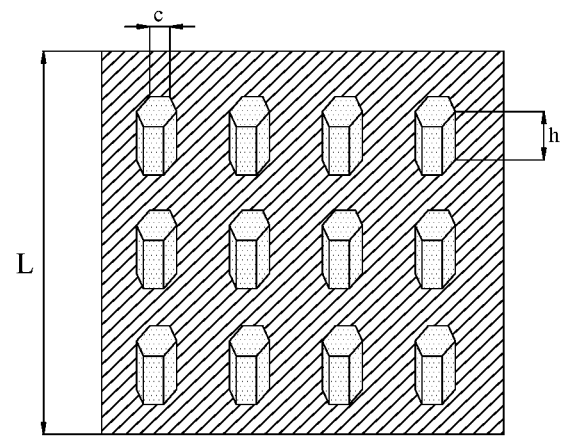

As shown in FIG. 5(a) to FIG. 6, the micro-convex bodies 57 are evenly arranged on the inner wall of the acceleration chamber 51. In this embodiment, the micro-convex bodies are hexagonal prisms. Similarly, the micro-convex bodies 57 may also be cylinders, cones, and polygonal prisms. Horizontal center-to-center distances between the micro-convex bodies 57 are between 5 μm and 50 μm, vertical center-to-center distances b are between 5 μm and 50 μm, side lengths c are between 2 μm and 7 μm, and heights h are between 3 μm and 30 μm, and an area occupancy ratio η (that is, a ratio of a projected area of all of the micro-convex bodies 57 to an area of the inner surface of the entire acceleration chamber 51) is between 20% and 80%.

In this embodiment, a is 15 μm 3 μm, b is 15 μm 3 μm, c is 4 μm 0.5 μm, h is 10 μm±1 μm, and η is 40%. A square with a side length of L intercepted on the inner surface of the acceleration chamber 51 is an analytical unit having an area of $L^2$.

It should be noted that an active design of a roughness factor of the inner surface of the acceleration chamber of the nozzle may be implemented through setting of a parameter of the micro-convex body.

The formation of turbulent flow in a traditional electrostatic nozzle does not facilitate uniform spreading of the minimal quantity lubrication liquid. The lubrication liquid and compressed air become extremely unstable under a mixing action of the rotating airflow with uneven velocity distribution and a large turbulence intensity. Such phenomenon becomes more obvious after acceleration by the acceleration chamber, and finally sizes of the droplets ejected from the nozzle are also distributed very unevenly, and large fluctuation of the formed liquid line also does not facilitate the controllable transportation of the formed droplets. According to the micro-textured electrostatic nozzle in this embodiment, a plurality of micro-convex bodies are disposed on the inner surface of the acceleration chamber, greatly increasing the lipophilic performance of the inner surface of the acceleration chamber. The lipophilic performance of the inner surface of the acceleration chamber can effectively absorb the minimal quantity lubrication liquid flowing out of the mixing chamber, to increase motion resistance of the minimal quantity lubrication liquid and form a uniform oil film under the pulling action of compressed air, greatly reducing disturbance of the jet and improving uniformity of the liquid line of the liquid film, thereby further causing finally formed droplets to be distributed more uniformly and motion paths thereof to be more controllable. The plurality of micro-convex bodies disposed on the inner surface of the acceleration chamber also greatly increase a contact area between the nozzle core and the minimal quantity lubrication liquid. Because of the better lipophilicity of the inner surface, time of contact between the minimal quantity lubrication liquid and the inner surface is greatly increased, providing more ideal charging performance.

Embodiment 2

As shown in FIG. 2 to FIG. 4, a dual-level composite micro-textured electrostatic nozzle in this embodiment includes:

an upper nozzle body 42, a lower nozzle body 43, an insulating seal ring 44, a nozzle core 45, an annular check ring 46, a minimal quantity lubrication liquid delivery pipe port 47, an air storage chamber 48, a rotating air hole 49, a gas-liquid mixing chamber 50, an acceleration chamber 51, a nozzle outlet 52, a high-voltage wire port 53, an outgoing high-voltage wire through hole 54, a check ring placement groove 55, a $V_2O_5$ nanofiber sheet 56, and a micro-convex body 57.

The upper nozzle body 42 is connected to an upper part through threads, the lower nozzle body 43 is connected to a lower part of the nozzle core 45 through threads. An insulating seal ring 44 is disposed between the upper nozzle body 42 and the lower nozzle body 43 to effectively prevent gas within the nozzle from leaking. The upper nozzle body 42 and the lower nozzle body 43 are made of an insulating material, and the nozzle core 45 is made of a metal conductive material. The minimal quantity lubrication liquid delivery pipe port 47 is disposed above the upper nozzle body 42, and the minimal quantity lubrication liquid delivery pipe port 47 may be connected to an insulating hose 37 through threads. Therefore, compressed air flowing through the insulating hose 37 may enter the electrostatic nozzle. The air storage chamber 48 is disposed in the nozzle core 45. The air storage chamber 48 functions to store the compressed air and decompress. Similarly, an empty space formed between the upper nozzle body 42 and the nozzle core 45 also plays a same role. The gas-liquid mixing chamber 50, the acceleration chamber 51, and the nozzle outlet 52 are sequentially disposed inside the nozzle core 45 from top to bottom. A contraction angle α of the acceleration chamber 51 is between 5-20°, a diameter of the nozzle outlet is B and a length thereof is L, and a value of L/B is between 2 and 6. In this embodiment, α is 13°, B is 1 mm, and L/B is 4.

The check ring placement groove 55 is disposed above the nozzle core 45, and the annular check ring 46 is fixedly bonded in the check ring placement groove 55. The annular check ring 46 is an elastic insulating annular rubber ring, and 4 to 10 pieces of $V_2O_5$ nanofiber sheets 56 are arranged in an array on the annular check ring 46, for example, 8 pieces in FIG. 3. The $V_2O_5$ nanofiber sheets 56 are bonded surround the annular check ring 46 to cover an annular center hole. An insulating oil pipe 38 passes through the center of a plurality of $V_2O_5$ nanofiber sheets 56 into the gas-liquid mixing chamber 50. The $V_2O_5$ nanofiber sheets 56 have a special property and may perform strong and reversible muscle-like contraction under an action of an external electric field, so as to tightly enclose the insulating oil pipe 38, preventing backflow of airflow and lubrication liquid caused by airflow in the gas-liquid mixing chamber 50. The annular check ring 46 has certain elasticity. Elastic deformation of the annular check ring may offset an amount of the contraction of the $V_2O_5$ nanofiber sheets 56. A rotating air hole 49 is disposed on the nozzle core 45. Rotating air holes 49 are arranged in an array along an outer wall of the gas-liquid mixing chamber 50. An inlet axis is tangent to a wall surface of an inner cavity of the gas-liquid mixing chamber 50. Compressed air flows through the rotating air hole 49 to enter the gas-liquid mixing chamber 50 at a tangential velocity v. The compressed air enters the gas-liquid mixing chamber 50 through a plurality of rotating air holes 49, and a velocity direction of the compressed air does not intersect with an axial center thereof. Therefore, a momentum moment exists for the incoming airflow corresponding to the axial center, promoting the airflow in the gas-liquid mixing chamber 50 to rotate around the axial center while advancing toward the nozzle outlet, thereby driving nanofluid to rotate to form a vortex flow. Formation of the vortex flow causes the minimal quantity lubrication liquid to be fully mixed with the compressed air, and also leads to formation of turbulent flow. The acceleration chamber 51 and the nozzle outlet 52 are mainly configured to accelerate a jet and spread the lubrication liquid in the nozzle. The lubrication liquid is usually pulled into a liquid film or a liquid line in the nozzle and at the outlet, and finally broken into droplets under the action of external forces such as an aerodynamic force and an electrostatic force. A high-voltage wire port 53 is disposed on the nozzle core 45, and an outgoing high-voltage wire through hole 54 is disposed on the lower nozzle body 43. A high-voltage DC wire 8 may be connected to the high-voltage wire port 53 through the outgoing high-voltage wire through hole 54, thereby supplying power to the nozzle core 45. A plurality of micro-convex bodies 57 are disposed on the inner wall of the acceleration chamber 51. A shape and a position of the micro-convex bodies 57 are shown in FIG. 7(a) and FIG. 7(b).

Figure 7A:
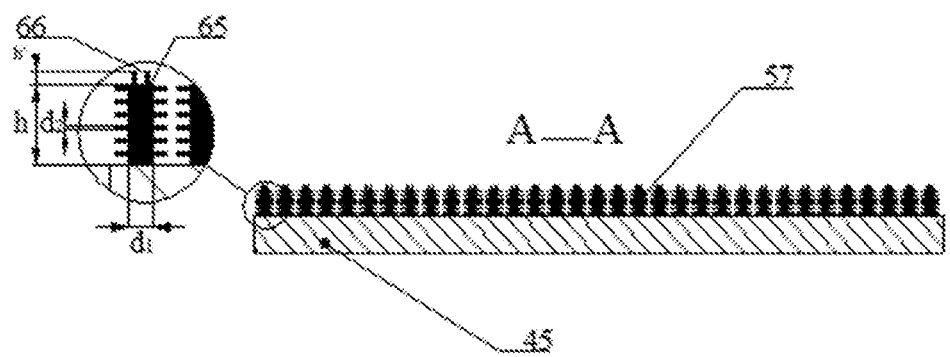
Figure 7B:
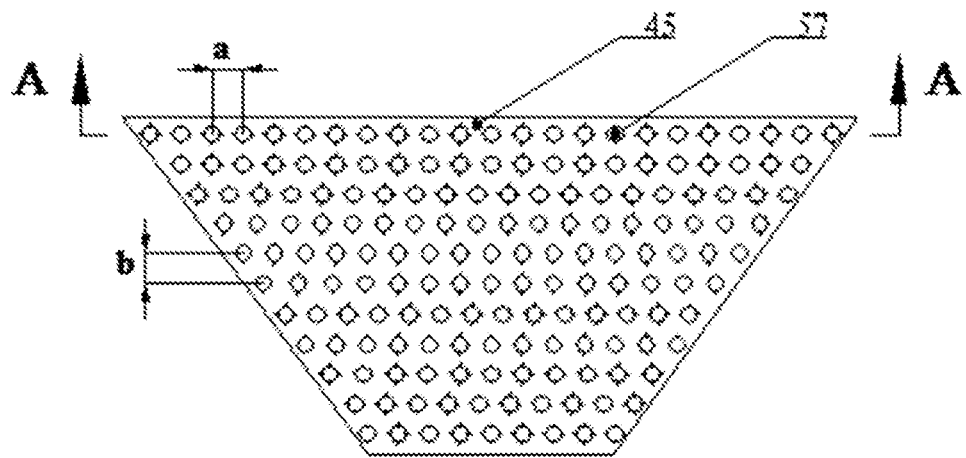
Figure 8A:
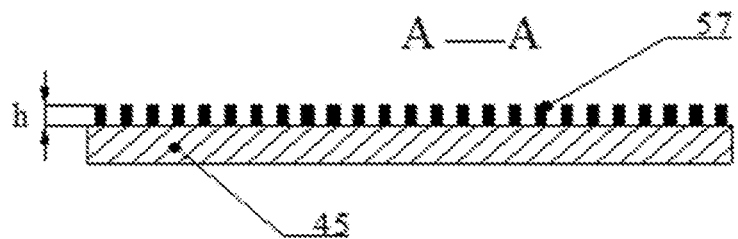
FIG. 8(a) is a schematic diagram of expanded micro-textured distribution on an inner surface of an acceleration chamber of an electrostatic nozzle for noise reduction and resistance enhancement according to an embodiment of the present disclosure.
Figure 8B:
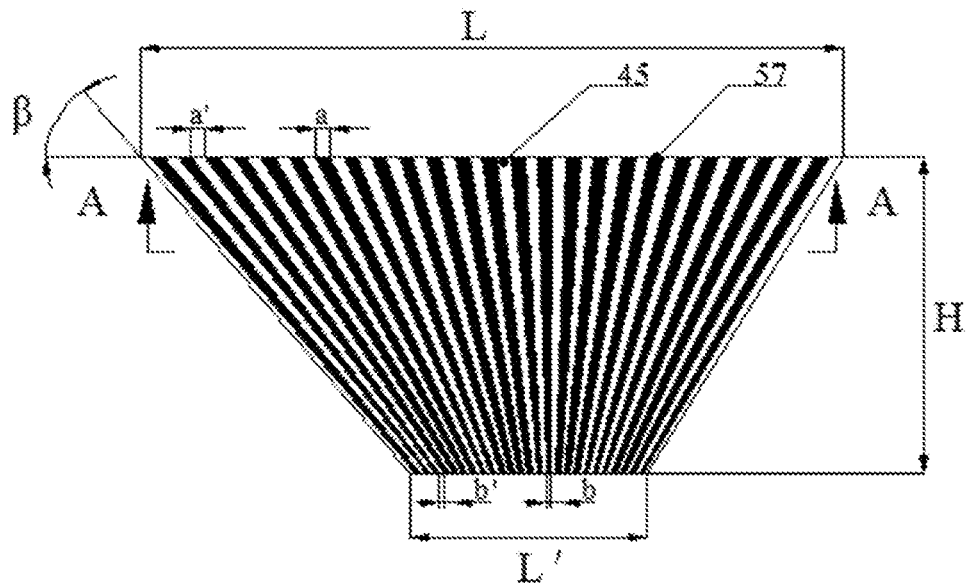
FIG. 8(b) is a schematic diagram of expanded micro-textured distribution on an inner surface of an acceleration chamber of an electrostatic nozzle for noise reduction and resistance enhancement according to an embodiment of the present disclosure.
Figures 9A, 9B:
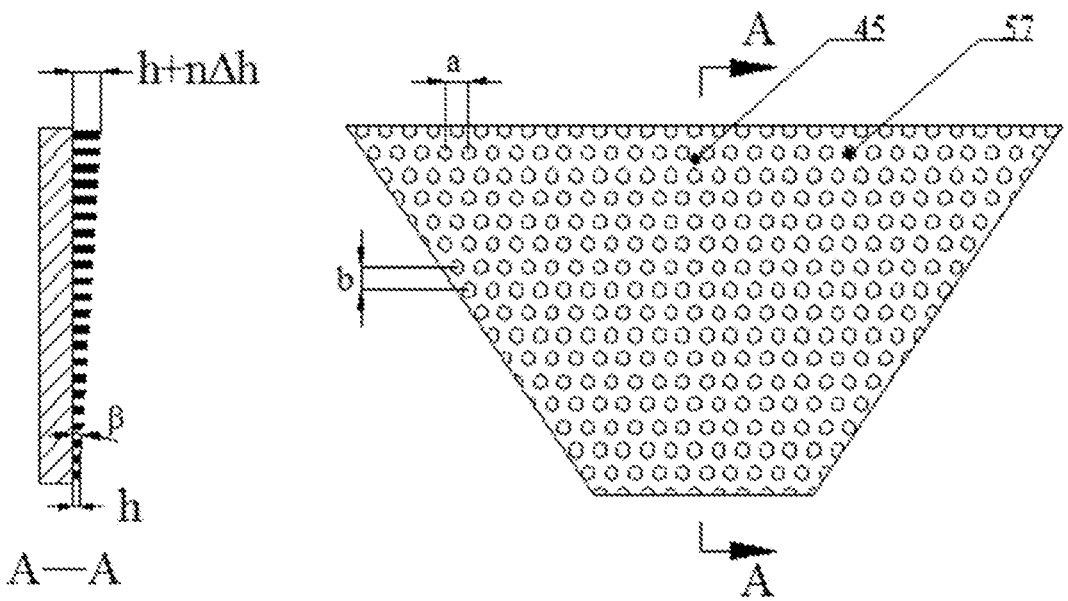
FIG. 9(a) is a schematic diagram of expanded micro-textured distribution on an inner surface of an acceleration chamber of a contact-type electrostatic nozzle with a gradient micro-convex body according to an embodiment of the present disclosure.
FIG. 9(b) is a schematic diagram of expanded micro-textured distribution on an inner surface of an acceleration chamber of a contact-type electrostatic nozzle with a gradient micro-convex body according to an embodiment of the present disclosure.
Figure 10:
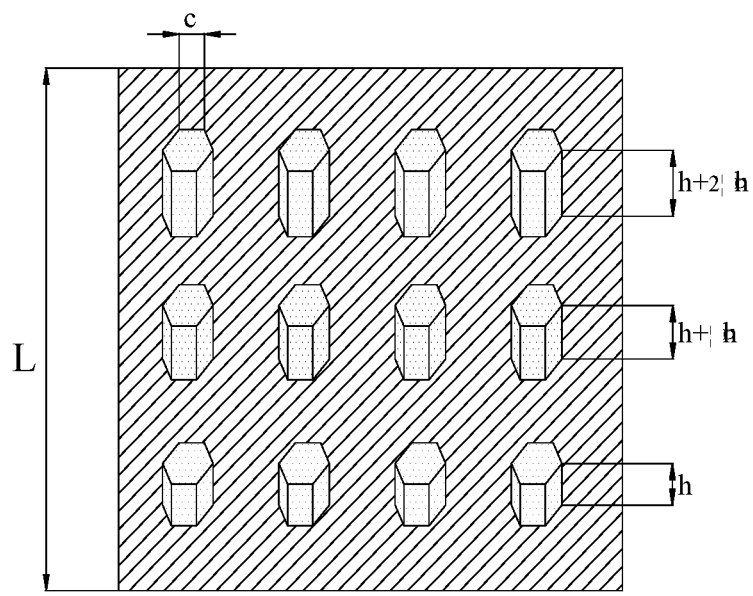
FIG. 10 is a schematic structural diagram of expanded micro-textured distribution on an inner surface of an acceleration chamber of a contact-type electrostatic nozzle with a gradient micro-convex body according to an embodiment of the present disclosure.

As shown in FIG. 7(a) and FIG. 7(b), the micro-convex body 57 in this embodiment includes a primary micro-convex body 65 and a secondary micro-convex body 66 that are evenly arranged on an inner wall of the acceleration chamber 51. The secondary micro-convex body 66 is disposed on the primary micro-convex body 65. In this embodiment, the primary micro-convex body 65 and the secondary micro-convex body 66 are both cylindrical with diameters of $d_1$ and $d_2$, respectively, $d_2$ being ⅕-⅔ of d1. Similarly, the primary micro-convex body and the secondary micro-convex body may be disposed to be cones and polygonal prisms. Horizontal center-to-center distances between the primary micro-convex bodies 65 are between 5 μm and 50 μm, vertical center-to-center distances b are between 5 μm and 50 μm, heights h are between 3 μm and 30 μm, and an area occupancy ratio η (that is, a ratio of a projected area of all of the primary micro-convex bodies 65 to an area of the inner surface of the entire acceleration chamber 51) of the primary micro-convex bodies 65 is between 20% and 80%. A number of the primary micro-convex bodies 65 is $n_1$ according to the area occupancy ratio η. A height h' of the secondary micro-convex body 66 is ⅕-⅓ of h, and an area occupancy ratio η' (that is, a ratio of a projected area of all of the secondary micro-convex bodies 66 to an area of a surface of the primary micro-convex bodies 65) of the secondary micro-convex bodies 66 is between 30% and 80%. A number of the secondary micro-convex bodies 66 on each primary micro-convex body 65 is $n_2$ according to the area occupancy ratio η'.

In this embodiment, $d_1$ is 4 μm±0.5 μm, $d_2$ is 1.5 μm±0.5 μm, a is 15 μm±m μm, b is 15 μm m±m, h is 10 μm±1 μm, η is 40%, h' is 3 μm 0.5 μm, and η' is 50%.

According to the dual-level composite micro-textured electrostatic nozzle in this embodiment, a plurality of micro-convex bodies are disposed on the inner surface of the acceleration chamber. The micro-convex body is a dual-level composite structure composed of a primary micro-convex body and a secondary micro-convex body. The composite micro-convex body undoubtedly increases the lipophilic performance of the inner surface of the acceleration chamber compared with a separate micro-convex body structure. The lipophilic performance of the inner surface of the acceleration chamber can effectively absorb the minimal quantity lubrication liquid flowing out of the mixing chamber, to increase motion resistance of the minimal quantity lubrication liquid and form a uniform oil film under the pulling action of compressed air, greatly reducing disturbance of the jet and improving uniformity of the liquid line of the liquid film, thereby further causing finally formed droplets to be distributed more uniformly and motion paths thereof to be more controllable. A plurality of dual-level composite micro-convex bodies disposed on the inner surface of the acceleration chamber also greatly increase a contact area between the nozzle core and the minimal quantity lubrication liquid. Because of the better lipophilicity of the inner surface, time of contact between the minimal quantity lubrication liquid and the inner surface is greatly increased, providing better charging performance.

Embodiment 3

As shown in FIG. 2 to FIG. 4, an electrostatic nozzle for noise reduction and resistance enhancement in this embodiment specifically includes: an upper nozzle body 42, a lower nozzle body 43, an insulating seal ring 44, a nozzle core 45, an annular check ring 46, a minimal quantity lubrication liquid delivery pipe port 47, an air storage chamber 48, a rotating air hole 49, a gas-liquid mixing chamber 50, an acceleration chamber 51, a nozzle outlet 52, a high-voltage wire port 53, an outgoing high-voltage wire through hole 54, a check ring placement groove 55, a $V_2O_5$ nanofiber sheet 56, and a micro-convex body 57.

The upper nozzle body 42 is connected to an upper part through threads, the lower nozzle body 43 is connected to a lower part of the nozzle core 45 through threads. An insulating seal ring 44 is disposed between the upper nozzle body 42 and the lower nozzle body 43 to effectively prevent gas within the nozzle from leaking. The upper nozzle body 42 and the lower nozzle body 43 are made of an insulating material, and the nozzle core 45 is made of a metal conductive material. The minimal quantity lubrication liquid delivery pipe port 47 is disposed above the upper nozzle body 42, and the minimal quantity lubrication liquid delivery pipe port 47 may be connected to an insulating hose 37 through threads. Therefore, compressed air flowing through the insulating hose 37 may enter the electrostatic nozzle. The air storage chamber 48 is disposed in the nozzle core 45. The air storage chamber 48 functions to store the compressed air and decompress. Similarly, an empty space formed between the upper nozzle body 42 and the nozzle core 45 also plays a same role. The gas-liquid mixing chamber 50, the acceleration chamber 51, and the nozzle outlet 52 are sequentially disposed inside the nozzle core 45 from top to bottom. A contraction angle α of the acceleration chamber 51 is between 5-20°, a diameter of the nozzle outlet is B and a length thereof is L, and a value of L/B is between 2 and 6. In this embodiment, α is 13°, B is 1 mm, and L/B is 4. The check ring placement groove 55 is disposed above the nozzle core 45, and the annular check ring 46 is fixedly bonded in the check ring placement groove 55. The annular check ring 46 is an elastic insulating annular rubber ring, and 4 to 10 pieces of $V_2O_5$ nanofiber sheets 56 are arranged in an array on the annular check ring 46, for example, 8 pieces in FIG. 3. The $V_2O_5$ nanofiber sheets 56 are bonded surround the annular check ring 46 to cover an annular center hole. An insulating oil pipe 38 passes through the center of a plurality of $V_2O_5$ nanofiber sheets 56 into the gas-liquid mixing chamber 50. The $V_2O_5$ nanofiber sheets 56 have a special property and may perform strong and reversible muscle-like contraction under an action of an external electric field, so as to tightly enclose the insulating oil pipe 38, preventing backflow of airflow and lubrication liquid caused by airflow in the gas-liquid mixing chamber 50. The annular check ring 46 has certain elasticity. Elastic deformation of the annular check ring may offset an amount of the contraction of the $V_2O_5$ nanofiber sheets 56. A rotating air hole 49 is disposed on the nozzle core 45. Rotating air holes 49 are arranged in an array along an outer wall of the gas-liquid mixing chamber 50. An inlet axis is tangent to a wall surface of an inner cavity of the gas-liquid mixing chamber 50. Compressed air flows through the rotating air hole 49 to enter the gas-liquid mixing chamber 50 at a tangential velocity v. The compressed air enters the gas-liquid mixing chamber 50 through a plurality of rotating air holes 49, and a velocity direction of the compressed air does not intersect with an axial center thereof. Therefore, a momentum moment exists for the incoming airflow corresponding to the axial center, promoting the airflow in the gas-liquid mixing chamber 50 to rotate around the axial center while advancing toward the nozzle outlet, thereby driving nanofluid to rotate to form a vortex flow. Formation of the vortex flow causes the minimal quantity lubrication liquid to be fully mixed with the compressed air, and also leads to formation of turbulent flow. The acceleration chamber 51 and the nozzle outlet 52 are mainly configured to accelerate a jet and spread the lubrication liquid in the nozzle. The lubrication liquid is usually pulled into a liquid film or a liquid line in the nozzle and at the outlet, and finally broken into droplets under the action of external forces such as an aerodynamic force and an electrostatic force. A high-voltage wire port 53 is disposed on the nozzle core 45, and an outgoing high-voltage wire through hole 54 is disposed on the lower nozzle body 43. A high-voltage DC wire 8 may be connected to the high-voltage wire port 53 through the outgoing high-voltage wire through hole 54, thereby supplying power to the nozzle core 45. A plurality of micro-convex bodies 57 are disposed on the inner wall of the acceleration chamber 51. A shape and a position of the micro-convex bodies 57 are shown in FIG. 8 (*a*) and FIG. 8 (*b*).

As shown in FIG. 8 (*a*) and FIG. 8 (*b*), the micro-convex bodies 57 are evenly arranged on an inner wall of the acceleration chamber 51. An upper side length of the unfolded acceleration chamber 51 is L, a lower side length thereof is L', a height thereof is H, and an included angle between the upper side and an unfolded side is β. In this embodiment, the micro-convex bodies are in the shape of a tapered strip (tapered strip grooves are formed between the tapered strip-shaped micro-convex bodies 57). An upper width of the tapered strip-shaped micro-convex body 57 is between 3 μm and 30 μm, and an upper distance between two tapered strip-shaped micro-convex bodies 57 is a', a=a'. A lower width of the tapered strip-shaped micro-convex body 57 is b, and a lower distance between two tapered strip-shaped micro-convex bodies 57 is b', b=b'. In the embodiment, a/a'=L/L', a height of the tapered strip-shaped micro-convex body 57 is h. An area occupancy ratio η (that is, a ratio of a projected area of all of the micro convex bodies 57 to an area of the inner surface of the entire acceleration chamber 51) is between 20% and 80%. In this embodiment, a is 15 µm±m µm, h is 10 µm±m µm, and η is 50%.

According to the electrostatic nozzle for noise reduction and resistance enhancement in this embodiment, a plurality of tapered strip-shaped micro-convex bodies are disposed on the inner surface of the acceleration chamber, greatly increasing the lipophilic performance of the inner surface of the acceleration chamber. The lipophilic performance of the inner surface of the acceleration chamber can effectively absorb the minimal quantity lubrication liquid flowing out of the mixing chamber, to increase motion resistance of the minimal quantity lubrication liquid and form a uniform oil film under the pulling action of compressed air, greatly reducing disturbance of the jet and improving uniformity of the liquid line of the liquid film, thereby further causing finally formed droplets to be distributed more uniformly and motion paths thereof to be more controllable. In this case, the tapered strip grooves formed between the tapered strip-shaped micro-convex bodies may effectively reduce noise and reduce hazard to hearing health of an operator. The plurality of micro-convex bodies disposed on the inner surface of the acceleration chamber also greatly increase a contact area between the nozzle core and the minimal quantity lubrication liquid. Because of the better lipophilicity of the inner surface, time of contact between the minimal quantity lubrication liquid and the inner surface is greatly increased, providing more ideal charging performance.

Embodiment 4

As shown in FIG. 2 to FIG. 4, a contact-type electrostatic nozzle with a gradient micro-convex body in this embodiment includes: an upper nozzle body 42, a lower nozzle body 43, an insulating seal ring 44, a nozzle core 45, an annular check ring 46, a minimal quantity lubrication liquid delivery pipe port 47, an air storage chamber 48, a rotating air hole 49, a gas-liquid mixing chamber 50, an acceleration chamber 51, a nozzle outlet 52, a high-voltage wire port 53, an outgoing high-voltage wire through hole 54, a check ring placement groove 55, a $V_2O_5$ nanofiber sheet 56, and a micro-convex body 57.

The upper nozzle body 42 is connected to an upper part through threads, the lower nozzle body 43 is connected to a lower part of the nozzle core 45 through threads. An insulating seal ring 44 is disposed between the upper nozzle body 42 and the lower nozzle body 43 to effectively prevent gas within the nozzle from leaking. The upper nozzle body 42 and the lower nozzle body 43 are made of an insulating material, and the nozzle core 45 is made of a metal conductive material. The minimal quantity lubrication liquid delivery pipe port 47 is disposed above the upper nozzle body 42, and the minimal quantity lubrication liquid delivery pipe port 47 may be connected to an insulating hose 37 through threads. Therefore, compressed air flowing through the insulating hose 37 may enter the electrostatic nozzle. The air storage chamber 48 is disposed in the nozzle core 45. The air storage chamber 48 functions to store the compressed air and decompress. Similarly, an empty space formed between the upper nozzle body 42 and the nozzle core 45 also plays a same role. The gas-liquid mixing chamber 50, the acceleration chamber 51, and the nozzle outlet 52 are sequentially disposed inside the nozzle core 45 from top to bottom. A contraction angle α of the acceleration chamber 51 is between 5-20°, a diameter of the nozzle outlet is B and a length thereof is L, and a value of L/B is between 2 and 6. In this embodiment, α is 13°, B is 1 mm, and L/B is 4. The check ring placement groove 55 is disposed above the nozzle core 45, and the annular check ring 46 is fixedly bonded in the check ring placement groove 55. The annular check ring 46 is an elastic insulating annular rubber ring, and 4 to 10 pieces of $V_2O_5$ nanofiber sheets 56 are arranged in an array on the annular check ring 46, for example, 8 pieces in FIG. 3. The $V_2O_5$ nanofiber sheets 56 are bonded surround the annular check ring 46 to cover an annular center hole. An insulating oil pipe 38 passes through the center of a plurality of $V_2O_5$ nanofiber sheets 56 into the gas-liquid mixing chamber 50. The $V_2O_5$ nanofiber sheets 56 have a special property and may perform strong and reversible muscle-like contraction under an action of an external electric field, so as to tightly enclose the insulating oil pipe 38, preventing backflow of airflow and lubrication liquid caused by airflow in the gas-liquid mixing chamber 50. The annular check ring 46 has certain elasticity. Elastic deformation of the annular check ring may offset an amount of the contraction of the $V_2O_5$ nanofiber sheets 56. A rotating air hole 49 is disposed on the nozzle core 45. Rotating air holes 49 are arranged in an array along an outer wall of the gas-liquid mixing chamber 50. An inlet axis is tangent to a wall surface of an inner cavity of the gas-liquid mixing chamber 50. Compressed air flows through the rotating air hole 49 to enter the gas-liquid mixing chamber 50 at a tangential velocity v. The compressed air enters the gas-liquid mixing chamber 50 through a plurality of rotating air holes 49, and a velocity direction of the compressed air does not intersect with an axial center thereof. Therefore, a momentum moment exists for the incoming airflow corresponding to the axial center, promoting the airflow in the gas-liquid mixing chamber 50 to rotate around the axial center while advancing toward the nozzle outlet, thereby driving nanofluid to rotate to form a vortex flow. Formation of the vortex flow causes the minimal quantity lubrication liquid to be fully mixed with the compressed air, and also leads to formation of turbulent flow. The acceleration chamber 51 and the nozzle outlet 52 are mainly configured to accelerate a jet and spread the lubrication liquid in the nozzle. The lubrication liquid is usually pulled into a liquid film or a liquid line in the nozzle and at the outlet, and finally broken into droplets under the action of external forces such as an aerodynamic force and an electrostatic force. A high-voltage wire port 53 is disposed on the nozzle core 45, and an outgoing high-voltage wire through hole 54 is disposed on the lower nozzle body 43. A high-voltage DC wire 8 may be connected to the high-voltage wire port 53 through the outgoing high-voltage wire through hole 54, thereby supplying power to the nozzle core 45. A plurality of micro-convex bodies 57 are disposed on the inner wall of the acceleration chamber 51. A shape and a position of the micro-convex bodies 57 are shown in FIG. 9 (*a*) and FIG. 9 (*b*).

As shown in FIG. 9 (*a*), FIG. 9 (B), and FIG. 10, the micro-convex bodies 57 are evenly arranged on an inner wall of the acceleration chamber 51. In this embodiment, the micro-convex bodies are hexagonal prisms. Similarly, the micro-convex bodies 57 may also be cylinders, cones, and polygonal prisms. A transitional non-equal-height structure is used for the micro-convex body 57, that is, a height of the micro-convex body gradually decreases along a direction of the jet movement, and a height difference between two adjacent rows is Δh. Horizontal center-to-center distances of the micro-convex bodies 57 are between 5 μm and 50 μm, vertical center-to-center distances b are between 5 μm and 50 μm, a height h of a shortest micro-convex body is between 2 μm and 15 μm, a height difference Δh is between 0.3 μm and 2 μm, an area occupancy ratio η (that is, a ratio of a projected area of all of the micro-convex bodies 57 to an area of the inner surface of the entire acceleration chamber 51) is between 20% and 80%, and an included angle between an upper surface of the micro-convex body 57 and the inner surface of the acceleration chamber 51 is β. In this embodiment, a is 15 μm+3 μm, b is 15 μm+3 μm, h is 4 μm+0.3 μm, Δh is 0.5 μm±0.1 μm, and η is 40%. A square with a side length of L is intercepted, as an analysis unit having an area of $L^2$ and including a shortest micro-convex body, on the inner surface 51 of the acceleration chamber.

According to the contact-type electrostatic nozzle with a gradient micro-convex body in this embodiment, a plurality of transitional non-equal-height micro-convex bodies are disposed on the inner surface of the acceleration chamber. The structure of the transitional micro-convex body can cause motion resistance of minimal quantity lubrication liquid to be distributed in descending order in the acceleration chamber, helping to form a uniform oil film under the pulling action of compressed air, and greatly reducing disturbance of the jet and improving the uniformity of a liquid line of a liquid film, thereby causing finally formed droplets to be distributed more evenly and motion paths thereof to be more controllable. The plurality of micro-convex bodies disposed on the inner surface of the acceleration chamber also greatly increase a contact area between the nozzle core and the minimal quantity lubrication liquid. Because of the better lipophilicity of the inner surface, time of contact between the minimal quantity lubrication liquid and the inner surface is greatly increased, providing more ideal charging performance.

Embodiment 5

A minimal quantity lubricating and grinding system for a controllable jet in this embodiment includes the micro-textured electrostatic nozzle shown in FIG. 2 to FIG. 6.

Figure 11:
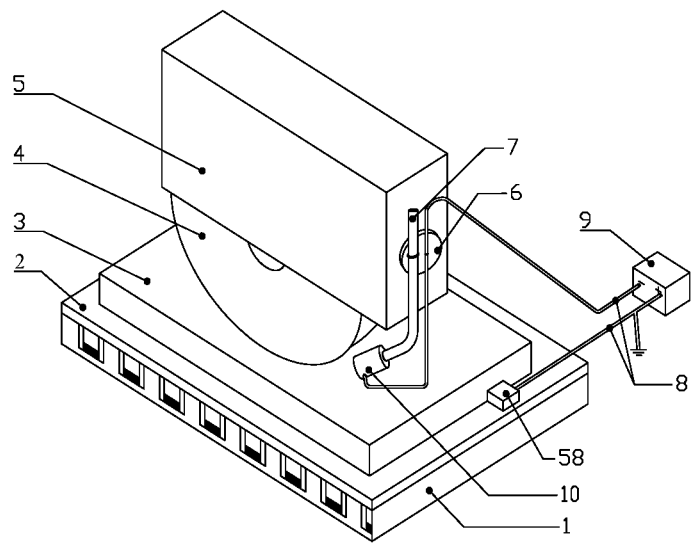
FIG. 11 is a schematic isometric view of a minimal quantity lubricating and grinding system for a controllable jet according to an embodiment of the present disclosure.

As shown in FIG. 11, the minimal quantity lubricating and grinding system for a controllable jet in this embodiment includes a grinding machine workbench 1, an insulating plate 2, a workpiece 3, a grinding wheel 4, a grinding wheel cover 5, a magnetic chuck 6, a minimal quantity lubrication liquid delivery pipe 7, a high-voltage DC wire 8, an adjustable high-voltage DC power supply 9, an electrostatic nozzle 10, a workpiece power-on device 58, and a minimal quantity lubrication device.

The insulating plate 2 is coated on the grinding machine workbench 1 (this material can be magnetically conductive, but not conductive, to ensure mounting of the workpiece and a stable electric field between the nozzle and the workpiece). The magnetic chuck 6 is adsorbed on a side surface of the grinding wheel cover 5, and the one connected to the nozzle in the minimal quantity lubrication liquid delivery pipe 7 and the high-voltage DC wire 8 is fixed by an insulating plastic link buckle. One end of the minimal quantity lubrication liquid delivery pipe 7 is connected to the minimal quantity lubrication device, and the other end is connected to the electrostatic nozzle. One end of one of the high-voltage DC wires 8 is connected to the electrostatic nozzle to supply power to the nozzle, and the other end is connected to a negative output end of the adjustable high-voltage DC power supply 9. One end of another high-voltage DC wire 8 is connected to the workpiece power-on device 58, and the other end is connected to a positive output end of the adjustable high-voltage DC power supply 9 and is grounded. The workpiece power-on device 58 is adsorbed on a non-processed surface of the workpiece 3, and the workpiece is connected to a positive electrode of the adjustable high-voltage DC power supply 9, so that the nozzle is negative and a surface of the workpiece is positive, and an electric field is formed between the nozzle and the workpiece to facilitate controllable delivery of minimal quantity lubrication droplets.

Figure 12:
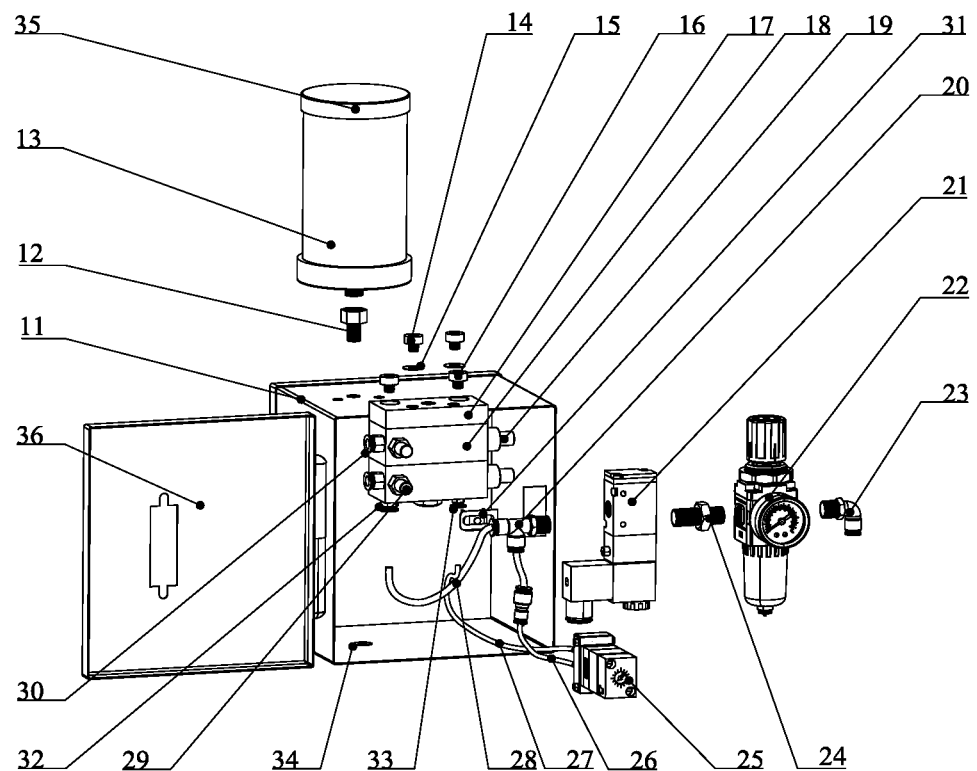
FIG. 12 is a schematic exploded view of a minimal quantity lubricating and grinding system for a controllable jet according to an embodiment of the present disclosure.

As shown in FIG. 12, the minimal quantity lubrication device specifically includes a casing 11, an insulating oil cup connector 12, an insulating oil cup 13, an insulating fixing bolt 14, an insulating gasket 15, an insulating connecting bolt 16, a minimal quantity pump fixing plate 17, a precision minimal quantity lubrication pump 18, an air flow adjusting knob 19, an insulating tee saddle joint 20, a solenoid valve 21, a filter pressure regulating valve 22, an air source connector 23, a bidirectional connector 24, a pulse controller 25, an air pipe I 26, an air pipe II 27, an air pipe III 28, a liquid flow adjusting knob 29, a gas-liquid outlet connector 30, a solenoid valve mounting bracket 31, a lubrication pump inlet port I 32, a lubrication pump inlet port II 33, a minimal quantity lubrication liquid delivery pipe outlet 34, an oil cup cover 35, and a casing cover 36.

The casing 11 is made of insulating plastic, and the casing cover 36 made of insulating plastic is disposed in front of the casing 11. Two sets of precision minimal quantity lubrication pumps 18 are disposed in the casing 11, the two sets of precision minimal quantity lubrication pumps 18 being vertically disposed side by side. The precision minimal quantity lubrication pump 18 is fixedly connected to the minimal quantity pump fixing plate 17 through the insulating connecting bolt 16, and a liquid inlet is reserved below the minimal quantity pump fixing plate 17 and a position thereof corresponds to a liquid inlet of the precision minimal quantity lubrication pump 18. Further, the minimal quantity pump fixing plate 17 is fixedly connected to the top of the inside of the casing 11 through the insulating fixing bolt 14 and the insulating gasket 15. The insulating oil cup connector 12 passes through an upper part of the casing 11 and is fixed, by screw connection, to a liquid inlet hole disposed above the minimal quantity pump fixing plate 17. The insulating oil cup 13 is connected to an upper part of the insulating oil cup connector 12 to supply liquid to the precision minimal quantity lubrication pump 18, and the oil cup cover 35 is disposed above the insulating oil cup 13.

One end of the air source connector 23 is fixed to the filter pressure regulating valve 22, and the other end is connected to a compressed air source. The filter pressure regulating valve 22 is disposed outside the casing 11, and compressed air enters the filter pressure regulating valve 22 from the air source connector 23. The filter pressure regulating valve 22 is configured to filter the compressed air and adjust an inlet pressure, thereby providing clean compressed air with a stable pressure for a lubricating system. The filter pressure regulating valve 22 is connected to the solenoid valve 21 through the bidirectional connector 24 to control entering of the compressed air. The solenoid valve 21 is fixedly mounted on the solenoid valve mounting bracket 31, and the solenoid valve mounting bracket 31 is disposed in the casing 11. An outlet of the solenoid valve 21 is connected to a right port of the insulating tee saddle joint 20. The compressed air is introduced into the pulse controller 25 through the air pipe I 26 through a lower port of the insulating tee saddle joint 20, and the compressed air further passes through the air pipe II 27 into the lubrication pump inlet port II 33 disposed below the precision minimal quantity lubrication pump 18. This path of compressed air is used for the precision minimal quantity lubrication pump 18 to suck minimal quantity lubrication liquid in the insulating oil cup 13, and may be referred to as a liquid suction air path. Therefore, an outlet frequency may be controlled by the pulse controller 25, and then a frequency of the precision minimal quantity lubrication pump 18 to suck lubrication liquid is controlled. A left port of the insulating tee saddle joint 20 is connected to the lubrication pump inlet port I 32 disposed below the precision minimal quantity lubrication pump 18 through the air pipe III 28. This path of compressed air is used to deliver atomized minimal quantity lubrication liquid, and may be referred to as an atomization air path. The air flow adjusting knob 19 and the liquid flow adjusting knob 29 are disposed on the precision minimal quantity lubrication pump 18, the air flow adjusting knob 19 being configured to adjust a flowing amount of compressed air in the atomization air path, and the liquid flow adjusting knob 29 being configured to adjust a sucked liquid amount in each pulse of the precision minimal quantity lubrication pump 18. The minimal quantity lubrication liquid delivery pipe 7 is connected to the gas-liquid outlet connector 30 disposed on the precision minimal quantity lubrication pump 18 through the minimal quantity lubrication liquid delivery pipe outlet 34 disposed below the casing, and is configured to output atomized air and minimal quantity lubrication liquid.

Figure 13:
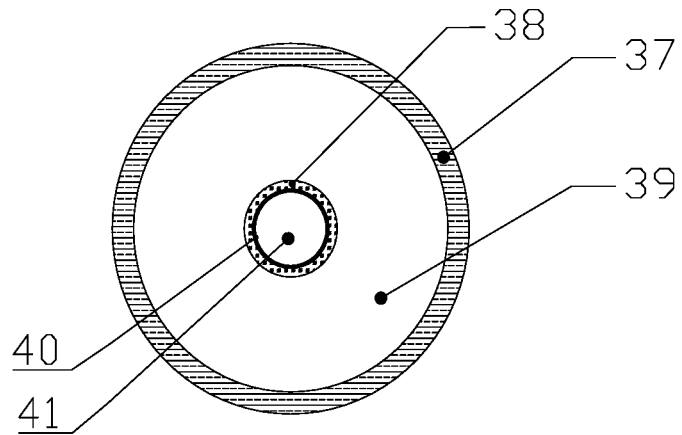
FIG. 13 is a cross-sectional view of a minimal quantity lubrication liquid delivery pipe according to an embodiment of the present disclosure.

As shown in FIG. 13, the minimal quantity lubrication liquid delivery pipe 7 specifically includes an insulating hose 37, an insulating oil pipe 38, a gas delivery cavity 39, a hydrophobic and oleophobic carbon-nano coating 40, and a liquid delivery cavity 41.

An outermost side of the minimal quantity lubrication liquid delivery pipe 7 is the insulating hose 37, and the insulating oil pipe 38 is disposed inside the minimal quantity lubrication liquid delivery pipe, the gas delivery cavity 39 being formed between the insulating hose 37 and the insulating oil pipe 38 for delivery of atomized air. The hydrophobic and oleophobic carbon-nano coating 40 is coated inside the insulating oil pipe 38, and the liquid delivery cavity is formed inside the insulating oil pipe. One end of the insulating hose 37 is connected to the gas-liquid outlet connector 30, and the other end is connected to the electrostatic nozzle, so that the atomized air enters the electrostatic nozzle through the precision minimal quantity lubrication pump 18. One end of the insulating oil pipe 38 passes through the gas-liquid outlet connector 30 and is connected to a minimal quantity lubrication liquid outlet disposed inside the precision minimal quantity lubrication pump 18, and the other end is connected to the electrostatic nozzle, so that the minimal quantity lubrication liquid enters the electrostatic nozzle through the precision minimal quantity lubrication pump 18. In this embodiment, the atomized air and the minimal quantity lubrication liquid are supplied coaxially to the nozzle.

Figure 14:
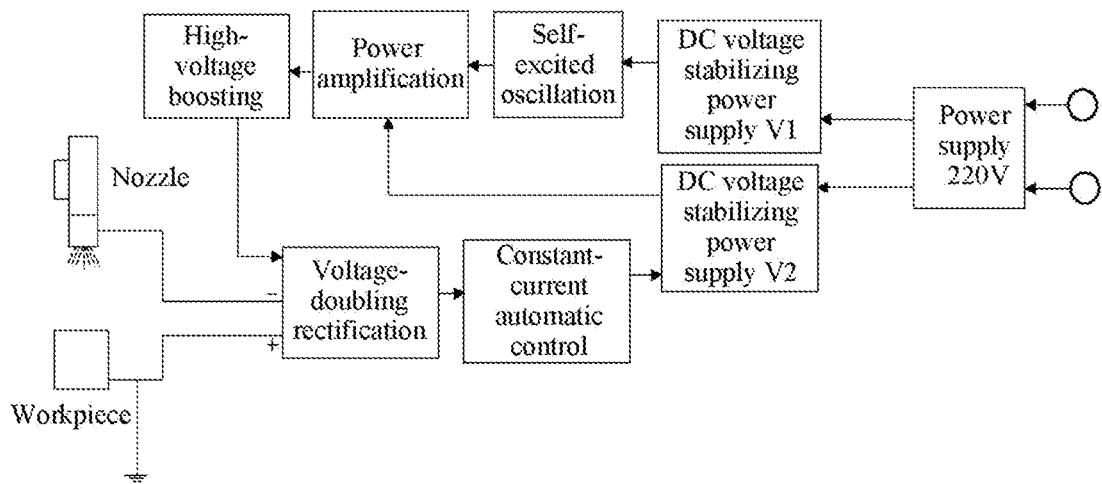
FIG. 14 is a circuit block diagram of an adjustable high-voltage DC power supply according to an embodiment of the present disclosure.

As shown in FIG. 14, the adjustable high-voltage DC power supply includes an AC power supply unit, a DC voltage stabilizing unit V1, a DC voltage stabilizing unit V2, a self-excited oscillation circuit, a power amplifier circuit, a high-frequency pulse booster, a voltage-doubling rectifier circuit, and a constant-current automatic control circuit.

The high-voltage DC power supply in this embodiment can generate a relatively high electrostatic voltage, and a power supply current is small, so that safety performance is high. In this embodiment, the casing, the insulating hose, the insulating oil pipe, the insulating fixing bolt, the insulating gasket, the insulating connecting bolt, the minimal quantity pump fixing plate, the insulating oil cup connector, and the insulating oil cup are all made of insulating materials, thereby effectively avoiding system leakage.

Figure 15A:
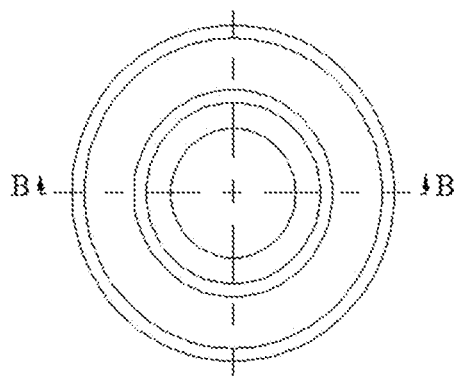
FIG. 15(a) is a cross-sectional view of a workpiece power-on device according to an embodiment of the present disclosure.
Figure 15B:
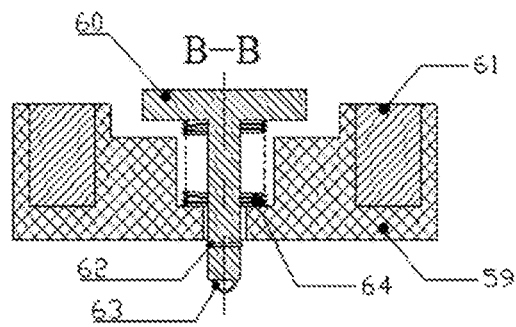
FIG. 15(b) is a top view of a workpiece power-on device according to an embodiment of the present disclosure.

As shown in FIG. 15(*a*) and FIG. 15(*b*), the workpiece power-on device 58 includes an insulating housing 59, a briquetted iron 60, a permanent magnet 61, a cotter pin slot 62, a connecting ring 63, and a compression spring 64.

The permanent magnet 61 is disposed in the insulating housing 59, the briquetted iron 60 is disposed at the center of the insulating housing 59, and a lower portion of the briquetted iron 60 passes through the insulating housing 59. The cotter pin slot 62 and the connecting ring 63 are disposed at a tail portion of the briquetted iron 60, and the compression spring 64 is disposed between the briquetted iron 60 and the insulating housing 59. When the workpiece power-on device 58 is close to a non-processed surface of a workpiece, the permanent magnet 61 produces an attractive force with the workpiece 3 to compress the compression spring 64, and the compression spring 64 provides a reaction force to ensure that the briquetted iron 60 is closely connected to the workpiece 3. The cotter pin slot 62 is disposed on the briquetted iron 60 and is configured to insert a cotter pin to prevent the briquetted iron 60 and the compression spring 64 from falling out of the insulating housing 59 while ensuring that the workpiece power-on device 58 is not attracted to the workpiece 3. The connecting ring 63 is connected to a positive terminal of an adjustable high-voltage DC power supply 9 through a high-voltage DC wire 8.

A specific working process of the minimal quantity lubricating and grinding system for a controllable jet in this embodiment is as follows:

The insulating plate 2 is laid on the grinding machine workbench 1, the workpiece 3 is placed on the insulating plate 2, and a magnetic switch of the workbench is turned on to tighten the workpiece. The electrostatic nozzle connects the upper nozzle body 42, the lower nozzle body 43, the insulating seal ring 44, the nozzle core 45, and the annular check ring 46 according to the above-mentioned connection method. The oil cup cover 35 above the insulating oil cup 13 is opened to inject lubrication liquid (usually nanofluid mixed by pure plant-based oil and nanoparticles) into the insulating oil cup 13. Two ends of the minimal quantity lubrication liquid delivery pipe 7 are respectively connected to the electrostatic nozzle and the minimal quantity lubrication device, the insulating hose 37 connected to the electrostatic nozzle at one end is connected to the minimal quantity lubrication liquid delivery pipe port 47, and the insulating oil pipe 38 passes through the center of a plurality of $V_2O_5$ nanofiber sheets 56 into the gas-liquid mixing chamber 50. The insulating hose 37 connected to the minimal quantity lubrication device at one end is connected to the gas-liquid outlet connector 30 disposed on the precision minimal quantity lubrication pump 18, and one end of the insulating oil pipe 38 passes through the gas-liquid outlet connector 30 and is connected to the minimal quantity lubrication liquid outlet disposed inside the precision minimal quantity lubrication pump 18. The insulating oil pipe 38 can deliver the lubrication liquid in the minimal quantity lubrication pump to the gas-liquid mixing chamber 50 through the liquid delivery cavity 41. The insulating hose 37 can deliver atomized droplets to the nozzle body through the gas delivery cavity 39 by using compressed air. One end of a high-voltage DC wire 8 is connected to the high-voltage wire port 53 through the outgoing high-voltage wire through hole 54, and the other end is connected to a negative terminal of the adjustable high-voltage DC power supply 9. The minimal quantity lubrication liquid delivery pipe 7 and the high-voltage DC wire 8 are fixed on the grinding wheel cover 5 by the magnetic chuck 6 to prevent movement. One end of another high-voltage DC wire 8 is connected to the connecting ring 63, and the other end is connected to the positive terminal of the adjustable high-voltage DC power supply 9. The workpiece power-on device 58 is adsorbed on a non-processed surface of the workpiece 3, so that an electric field is formed between the electrostatic nozzle and the workpiece 3 to facilitate controllable delivery of minimal quantity lubrication droplets. In this solution, the casing 11, the insulating hose 37, the insulating oil pipe 38, the insulating fixing bolt 14, the insulating gasket 15, the insulating connecting bolt 16, the minimal quantity pump fixing plate 17, the insulating oil cup connector 12, and the insulating oil cup 13 are all made of insulating materials, thereby effectively avoiding system leakage.

An external air source is disposed on the air source connector 23 to provide compressed air for the minimal quantity lubrication device, and the filter pressure regulating valve 22 is opened to be adjusted to a required pressure. The compressed air enters the solenoid valve 21 through the filter pressure regulating valve 22 and the bidirectional connector 24, and the solenoid valve 21 can control entering of the compressed air. The compressed air enters the insulating tee saddle joint 20 through an outlet of the solenoid valve 21, and the insulating tee saddle joint 20 divides the compressed air into two paths, one path of compressed air entering the pulse controller 25 through the air pipe I 26, and the pulse controller 25 can control an outlet frequency. The frequency of the compressed air is adjusted by the pulse controller 25 to enter the lubrication pump inlet port II 33 disposed below the precision minimal quantity lubrication pump 18 through the air pipe II 27. This path of compressed air is used for the precision minimal quantity lubrication pump 18 to suck minimal quantity lubrication liquid in the insulating oil cup 13, and may be referred to as a liquid suction air path. The frequency of compressed air entering the precision minimal quantity lubrication pump 18 is controlled by the pulse controller 25, and then a frequency of the precision minimal quantity lubrication pump 18 to suck lubrication liquid is controlled. After the minimal quantity lubrication liquid is sucked into the precision minimal quantity lubrication pump 18, a discharge amount of the lubrication liquid in each pulse may be adjusted by the liquid flow adjusting knob 29, and the minimal quantity lubrication liquid is delivered into the gas-liquid mixing chamber 50 through the liquid delivery cavity 41 after being discharged. The other path of compressed air enters the lubrication pump inlet port I 32 disposed below the precision minimal quantity lubrication pump 18 through the air pipe III 28. An output amount of this path of compressed air may be adjusted by the flow adjusting knob 19, and the adjusted compressed air is delivered to the nozzle body through the gas delivery cavity 39 for delivery of atomized minimal quantity lubrication liquid. The hydrophobic and oleophobic carbon-nano coating 40 is coated inside the insulating oil pipe 38. Because adsorbed gas molecules can exist stably on a nano-size lower concave surface, there is a stable gas film on a macro surface, so that neither oil nor water can be directly in contact with a surface of materials. Therefore, the surface of the materials exhibits an extraordinary double-phobic (oleophobic and hydrophobic) property, so that the problem of clogged oil pipes can be effectively avoided.

The minimal quantity lubrication liquid enters the gas-liquid mixing chamber 50 through the liquid delivery cavity 41, and the compressed air enters the air storage chamber 48 through the gas delivery cavity 39 and further enters the gas-liquid mixing chamber 50 through the rotating air hole 49. Rotating air holes 49 are arranged in an array along an outer wall of the gas-liquid mixing chamber 50. An inlet axis is tangent to a wall surface of an inner cavity of the gas-liquid mixing chamber 50. Compressed air flows through the rotating air hole 49 to enter the gas-liquid mixing chamber 50 at a tangential velocity v. The compressed air enters the gas-liquid mixing chamber 50 through a plurality of rotating air holes 49, and a velocity direction of the compressed air does not intersect with an axial center thereof. Therefore, a momentum moment exists for the incoming airflow corresponding to the axial center, promoting the airflow in the gas-liquid mixing chamber 50 to rotate around the axial center while advancing toward the nozzle outlet, thereby driving nanofluid to rotate to form a vortex flow. Formation of the vortex flow causes the minimal quantity lubrication liquid to be fully mixed with the compressed air, and also leads to formation of turbulent flow. The minimal quantity lubrication liquid and the compressed air pass through the acceleration chamber 51 and the nozzle outlet 52 after being mixed, and a mixed flow is accelerated and spread in this process. The lubrication liquid is usually pulled into a liquid film or a liquid line in the nozzle and at the outlet, and finally broken into droplets under the action of external forces such as an aerodynamic force and an electrostatic force. The formation of turbulent flow in a traditional electrostatic nozzle does not facilitate uniform spreading of the minimal quantity lubrication liquid. The lubrication liquid and compressed air become extremely unstable under a mixing action of the rotating airflow with uneven velocity distribution and a large turbulence intensity. Such phenomenon becomes more obvious after acceleration by the acceleration chamber 51, and finally sizes of the droplets ejected from the nozzle are also distributed very unevenly, and large fluctuation of the formed liquid line also does not facilitate the controllable transportation of the formed droplets. In order to resolve this problem, in this solution, a plurality of micro-convex bodies 57 are disposed on an inner surface of the acceleration chamber, and shapes and distribution thereof are described above. Therefore, a charged nozzle containing a micro-texture is made.

Beneficial effects of the micro-textured charging nozzle may be analyzed through the Yong's equation and the Wenzel model. A contact angle of liquid on a solid surface is determined by equilibrium of surface tension between solid, gas, and liquid interfaces. A final equilibrium state minimizes total system energy, and therefore the liquid is generally in a stable or metastable state on the solid surface. Generally, a contact angle of a droplet on a smooth and flat solid surface can be expressed by the Yong's equation:

$$\gamma_{sv} = \gamma_{sl} + \gamma_{lv} \cos \theta$$

namely:

$$\cos \theta = \frac{\gamma_{sv} - \gamma_{sl}}{\gamma_{lv}} \qquad (2)$$

$\gamma_{sv}$, $\gamma_{sl}$, and $\gamma_{lv}$ are respectively surface tension at solid-gas, solid-liquid, and gas-liquid interfaces. $\theta$ is an equilibrium contact angle, and may also be referred to as an intrinsic contact angle.

The Wenzel model believes that a true contact angle of placing a droplet on a rough surface is difficult to determine. Only an apparent contact angle is measured through the experiment, and may be expressed by $\theta_r$. If the liquid on the solid surface can fill pits on the rough solid surface, this is referred to as a wet contact. In this case, under constant temperature and pressure conditions, a change in system free energy due to an interface change can be expressed as follows:

$$d_\varepsilon = r(\gamma_{sv} - \gamma_{sl})dx + v_{lv}dx \cos\theta_r \quad (3)$$

$d_E$ is total energy required when a contact line moves with an infinitesimal amount of dx, and $d_E=0$ in an equilibrium state. Further, a relationship between the apparent contact angle and the intrinsic contact angle may be as follows:

$$\cos\theta_r = r(\gamma_{sv} - \gamma_{sl})/\gamma_{lv} \quad (4)$$

r is a roughness factor and is a ratio of an actual contact area of the solid-liquid interface to the apparent contact area ($r \geq 1$). The following formula can be obtained by comparing formula (2) with formula (4):

$$\cos\theta_r = r\cos\theta \quad (5)$$

The Wenzel model shows that the rough surface makes the solid-liquid contact area actually greater than the apparent contact area, thus geometrically enhancing lyophobicity or lyophilicity. When $\theta<90°$, $\theta_r$ decreases as the surface roughness increases, and the surface becomes more lyophilic. When $\theta>90°$, $\theta_r$ increases as the surface roughness increases, and the surface becomes more lyophobic. The nozzle core 45 used in this solution is a metal conductive material and is usually copper or stainless steel, and surfaces of these materials are lipophilic, that is, when $\theta<90°$. An inner surface of a traditional nozzle is smoother and a value of r is smaller. In this solution, a plurality of micro-convex bodies 57 are disposed on the inner surface of the acceleration chamber 51. This undoubtedly greatly increases the value of r so that r is much greater than 1, greatly increasing the lipophilic performance of the inner surface of the acceleration chamber 51. Hexagonal prism micro-convex bodies used in this solution are evenly distributed on the surface per unit area of $L^2$, and the hexagonal prism micro-convex body has a side length c and a height h. A quantity n of distributed micro-convex bodies can be determined according to $\eta$ and an actual area of the inner surface of the acceleration chamber. In this case, a roughness factor r per unit area can be calculated as follows:

$$r = \frac{L^2 + n \cdot 6ch}{L^2} \quad (6)$$

According to formula (6), setting of the quantity n, the side length c, and the height h of the micro-convex body can implement an active design of the roughness factor r.

The lipophilic performance of the inner surface of the acceleration chamber 51 can effectively absorb the minimal quantity lubrication liquid flowing out of the mixing chamber 50, to increase motion resistance of the minimal quantity lubrication liquid and form a uniform oil film under the pulling action of compressed air, greatly reducing disturbance of the jet and improving uniformity of the liquid line of the liquid film, thereby further causing finally formed droplets to be distributed more uniformly and motion paths thereof to be more controllable. The plurality of micro-convex bodies 57 disposed on the inner surface of the acceleration chamber 51 also greatly increase a contact area between the nozzle core 45 and the minimal quantity lubrication liquid. Because of the better lipophilicity of the inner surface, time of contact between the minimal quantity lubrication liquid and the inner surface is greatly increased, providing more ideal charging performance.

A switch of the adjustable high-voltage DC power supply 9 is turned on to supply power to the nozzle core 45. The nozzle core 45 is charged by contact with the minimal quantity lubrication liquid. The minimal quantity lubrication liquid is atomized into uniform small droplets under the action of an electrostatic force and a pneumatic force, and then can be delivered to a cutting area to implement a cooling and lubricating function. A specific atomization mechanism of the minimal quantity lubrication liquid can be expressed as follows:

Electrostatic atomization is a phenomenon in which an electrostatic force overcomes surface tension of liquid, causing the liquid to break into tiny droplets. The contact between the nozzle core 45 and the minimal quantity lubrication liquid makes the surface of the liquid carry a large amount of identical charge, increasing surface activity of the liquid, making surface molecules significantly align, and reducing the surface tension. When a volume of the liquid is constant, the surface tension gradually decreases as an amount of charge increases. When the surface tension is not large enough to bind the liquid, the liquid is broken into fine droplets under the mutual repulsion between the identical charge on the surface and liquid surface disturbance caused by an external force.

When there is a high relative velocity between the droplets and surrounding air, breaking of the droplets is controlled by a pneumatic force, surface tension, and a viscous force. For liquid with lower viscosity, breaking of the droplets is mainly determined by a pneumatic force and surface tension. A pneumatic force on a liquid film, a liquid line, and large droplets is $0.5\mu_g \Delta V^2$, where $\rho_g$ is a gas density, and $\Delta V$ is a relative velocity of gas and liquid. However, a cohesive force generated by the surface tension prevents the liquid from deforming and breaking. The cohesive force can be expressed as $4\sigma/D$, where $\sigma$ is inherent surface tension of the liquid, and D is an initial droplet diameter.

When the droplet diameter decreases, the cohesive force increases. When the cohesive force and tensile stress caused by the pneumatic force are balanced, the droplet remains stable. If the two cannot offset each other, the droplet is deformed or even broken. According to the principle of balance between the tensile stress generated by the pneumatic force acting on the droplet and the cohesive force generated by the surface tension, a dimensionless number can be obtained:

$$We = \frac{\rho_g \Delta V^2 D}{\sigma} = 8 \quad (7)$$

It can be learned that when the Weber number is greater than 8, force on the droplets is unbalanced and the droplets are deformed. In addition, according to formula (7), a maximum steady-state droplet diameter corresponding to $\Delta V$ can be obtained:

$$D_{max} = \frac{8\sigma}{\Delta V^2 \rho_g} \quad (8)$$

Under the action of Coulomb repulsion, surface tension of the charged droplet becomes weak, and surface tension after the weakening is:

$$\sigma' = \sigma - \frac{q^2}{64\pi^2 \varepsilon r^3} \quad (9)$$

r is a radius of the droplet, q is an amount of charge of the droplet, and is a dielectric constant of the surrounding air. It can be clearly learned from the formula that when the charge q increases, the surface tension decreases, and therefore the charge on the droplet surface contributes to atomization.

In this case, the We number of the charged droplet can be expressed as:

$$We = \frac{\rho_g \Delta V^2 D}{\sigma - \frac{q^2}{64\pi^2 \varepsilon r^3}} = \frac{128\pi^2 \varepsilon R^4 \rho_g \Delta V^2}{64\pi^2 \varepsilon R^3 \sigma = q^2} \quad (10)$$

It can be learned from formula (10) that breaking of the charged droplet in high-speed airflow is closely related to a relative gas-liquid velocity, a gas-liquid physical parameter, and a charging field. In addition, if the droplet reaches a stable state in the airflow, after the static electricity is charged, the We number increases and the liquid surface tension decreases, which is not enough to resist the pneumatic force. The droplet is further deformed and broken, and therefore when gas-liquid parameters are the same, a particle size of the atomized droplet after the static electricity is charged is smaller. This achieves the purpose of refining the particle of the atomized droplet, and the same charge on the droplet surface can ensure a more uniform distribution of droplets.

A formula for calculating an amount of charge of contact charging is as follows:

$$q_t = \frac{12\pi\varepsilon_0 \varepsilon r_1^2 E_0}{\varepsilon_0 + 2\varepsilon} \times \frac{t}{t+\tau} - \frac{q_{max} t}{t+\tau} \tag{11}$$

$q_t$ is an amount of charge of a large droplet before breaking, $\varepsilon_0$ and $\varepsilon$ are dielectric constants of air and a minimal quantity lubrication droplet, $r_1^2$ is a radius of the large droplet before breaking, $E_0$ is a spatial electric field strength, $q_{max}$ is an amount of saturation charge of the droplet, $\tau$ is a charging time constant, and t is a charging time. According to Formula 11, an effective method to increase the amount of charge is to increase an electric field strength or increase a charge time, and disposing of the micro-convex body 57 can effectively increase the charge time t. A Sauter mean diameter $d_{32}$ after the minimal quantity lubrication liquid is atomized by charge can be calculated by the following formula:

$$d_{32} = \frac{k_1}{|u_l - u_g|}\left(\frac{\sigma}{\rho_l}\right)^{0.5} + \frac{k_2}{\rho_l^{1.12}}\left(\frac{\mu_l}{\sigma^{0.5}}\right)^{0.45}\left(\frac{Q_Z}{Q_l}\right)^{1.5}|u_l - u_g| \tag{12}$$

$k_1$ is a coefficient related to a nozzle structure, $k_2$ is a coefficient related to the amount of charge qt, $|u_l-u_g|$ is an absolute value of a liquid-gas relative velocity, $\mu_l$ is a dynamic viscosity coefficient of the liquid, $\sigma$ is the liquid surface tension, $\rho_l$ is the liquid density, $Q_l$ is a liquid flow rate, and $Q_g$ is gas flow rate. It can be learned from formula (12) that a droplet particle size formed through charging and atomization is directly related to a nozzle structure, a liquid parameter, and a gas parameter.

The atomized droplets sprayed from the nozzle accelerate to the workpiece under the action of pneumatic force and the electric field force, and move directionally under the action of the electric field force to cover a surface of the workpiece to the maximum. In the electrostatic field, there is an "electrostatic entrapment" effect. Therefore, when the atomized droplets and nanoparticles move toward the workpiece, it is easier to enter a recess of the workpiece with a rough surface, thereby expanding a relative coverage area and implementing better lubrication and heat exchange.

It can be learned from FIG. 14 that the adjustable high-voltage DC power supply 37 includes a self-excited oscillation circuit, a power amplifier circuit, a high-frequency pulse booster, a voltage-doubling rectifier circuit, a DC voltage stabilizing unit V1, a DC voltage stabilizing unit V2, and a constant-current automatic control circuit. A working principle is that an input end is connected to an AC power supply, and the DC voltage stabilizing unit V1 and the DC voltage stabilizing unit V2 provide a DC voltage. The DC voltage stabilizing unit V1 serves as a working voltage of the self-excited oscillation circuit. The DC voltage stabilizing unit V2 is a main energy source for power conversion. The high-frequency pulse booster is rectified by the voltage-doubling rectifier circuit to obtain high-voltage static electricity. A basic pulse signal is obtained by the self-excited oscillation circuit, and after being amplified by the power amplifier circuit, the high-voltage signal is finally output under boosting of the high-frequency pulse booster, and a DC high voltage is output through the voltage-doubling rectifier circuit.

The characteristic of the power supply is that a high electrostatic voltage can be generated, and a power supply current is very small and is usually no more than 500 μA. The constant-current automatic control circuit automatically samples a working electrostatic current of the voltage-doubling rectifier circuit. In a constant current, when a working load increases normally, the working current does not rise. When an external load exceeds an allowable current, the self-excited oscillation circuit stops and the high voltage is cut off. This characteristic is reliable for the safety of the operator. Once a high-voltage end is approached or touched, a resulting electric shock current is very weak, and high-voltage output is cut off. Therefore, there is no danger to life.

Embodiment 6

A difference between a structure of a minimal quantity lubricating and grinding system for a controllable jet in this embodiment and the structure of the minimal quantity lubricating and grinding system for a controllable jet in Embodiment 5 lies in that a structure of an electrostatic nozzle is different.

The minimal quantity lubricating and grinding system for a controllable jet in this embodiment includes the dual-level composite micro-textured electrostatic nozzle shown in FIG. 2, FIG. 3, FIG. 4, FIG. 7(*a*), and FIG. 7(*b*).

A specific working process of minimal quantity lubricating and grinding system for a controllable jet in this embodiment is consistent with the specific working process in Embodiment 5, and a difference is as follows:

An inner surface of a traditional nozzle is smoother and a value of r is smaller. In this solution, a plurality of micro-convex bodies 57 are disposed on the inner surface of the acceleration chamber 51, and the micro-convex body 57 is a dual-level composite structure composed of a primary micro-convex body 65 and a secondary micro-convex body 66. The composite micro-convex body undoubtedly increases the value of r so that r is much greater than 1 compared with a separate micro-convex body structure, greatly increasing the lipophilic performance of the inner surface of the acceleration chamber 51. In this solution, diameters of the primary micro-convex body 65 and the secondary micro-convex body 66 are $d_1$ and $d_2$ and heights thereof are h and h' respectively. A quantity of the primary micro-convex body 65 is $n_1$ and a quantity of the secondary micro-convex body 66 is $n_2$. If a total area of the inner surface of the acceleration chamber 51 is S, the roughness factor r can be calculated as follows:

$$r = \frac{S + n_1 \pi d_1 h + n_1 n_2 \pi d_2 h'}{S} \quad (13)$$

According to formula (13), setting of the quantity $n_1$, the diameter $d_1$, and the height h of the primary micro-convex body 65 and the quantity $n_2$, the diameter $d_2$, and the height h' of the secondary micro-convex body 66 can implement an active design of the roughness factor r.

Embodiment 7

A difference between a structure of a minimal quantity lubricating and grinding system for a controllable jet in this embodiment and the structure of the minimal quantity lubricating and grinding system for a controllable jet in Embodiment 5 lies in that a structure of an electrostatic nozzle is different.

The minimal quantity lubricating and grinding system for a controllable jet in this embodiment includes the electrostatic nozzle for noise reduction and resistance enhancement shown in FIG. 2, FIG. 3, FIG. 4, FIG. 8(a), and FIG. 8(b).

A specific working process of minimal quantity lubricating and grinding system for a controllable jet in this embodiment is consistent with the specific working process in Embodiment 5, and a difference is as follows:

The Wenzel model shows that the rough surface makes the solid-liquid contact area actually greater than the apparent contact area, thus geometrically enhancing lyophobicity or lyophilicity. When θ<90°, $θ_r$ decreases as the surface roughness increases, and the surface becomes more lyophilic. When θ>90°, $θ_r$ increases as the surface roughness increases, and the surface becomes more lyophobic. The nozzle core 45 used in this solution is a metal conductive material and is usually copper or stainless steel, and surfaces of these materials are lipophilic, that is, when θ<90°. An inner surface of a traditional nozzle is smoother and a value of r is smaller. In this solution, a plurality of micro-convex bodies 57 are disposed on the inner surface of the acceleration chamber 51. This undoubtedly greatly increases the value of r so that r is much greater than 1, greatly increasing the lipophilic performance of the inner surface of the acceleration chamber 51. Tapered strip-shaped micro-convex bodies 57 used in this embodiment are evenly distributed on the inner surface of the acceleration chamber. An upper side length is a, a lower side length is b, and a height is h. A quantity of micro-convex bodies can be determined according to η and an area of the inner surface of the acceleration chamber. In this case, a roughness factor r per unit area can be calculated as follows:

$$r = \frac{\frac{L}{a}\left(\frac{L-L'}{2\cos\beta} + H\right) \cdot h + (L+L') \cdot H}{(L+L') \cdot H} \quad (14)$$

According to formula (14), the quantity n, the upper side length a, and the height h of the micro-convex body 57 can implement an active design of the roughness factor r.

The lipophilic performance of the inner surface of the acceleration chamber 51 can effectively absorb the minimal quantity lubrication liquid flowing out of the mixing chamber 50, to increase motion resistance of the minimal quantity lubrication liquid and form a uniform oil film under the pulling action of compressed air, greatly reducing disturbance of the jet and improving uniformity of the liquid line of the liquid film, thereby further causing finally formed droplets to be distributed more uniformly and motion paths thereof to be more controllable. The plurality of micro-convex bodies 57 disposed on the inner surface of the acceleration chamber 51 also greatly increase a contact area between the nozzle core 45 and the minimal quantity lubrication liquid. Because of the better lipophilicity of the inner surface, time of contact between the minimal quantity lubrication liquid and the inner surface is greatly increased, providing more ideal charging performance. In this case, the tapered strip grooves formed between the tapered strip-shaped micro-convex bodies may effectively reduce noise and reduce hazard to hearing health of an operator.

Embodiment 8

A difference between a structure of a minimal quantity lubricating and grinding system for a controllable jet in this embodiment and the structure of the minimal quantity lubricating and grinding system for a controllable jet in Embodiment 5 lies in that a structure of an electrostatic nozzle is different.

The minimal quantity lubricating and grinding system for a controllable jet in this embodiment includes the contact-type electrostatic nozzle with a gradient micro-convex body shown in FIG. 2, FIG. 3, FIG. 4, FIG. 9(a), FIG. 9(b), and FIG. 10.

A specific working process of minimal quantity lubricating and grinding system for a controllable jet in this embodiment is consistent with the specific working process in Embodiment 5, and a difference is as follows:

The Wenzel model shows that the rough surface makes the solid-liquid contact area actually greater than the apparent contact area, thus geometrically enhancing lyophobicity or lyophilicity. When θ<90°, $θ_r$ decreases as the surface roughness increases, and the surface becomes more lyophilic. When θ>90°, $θ_r$ increases as the surface roughness increases, and the surface becomes more lyophobic. The nozzle core 45 used in this solution is a metal conductive material and is usually copper or stainless steel, and surfaces of these materials are lipophilic, that is, when θ<90°. An inner surface of a traditional nozzle is smoother and a value of r is smaller. In this solution, a plurality of transitional micro-convex bodies 57 are disposed on the inner surface of the acceleration chamber 51. This undoubtedly greatly increases the value of r so that r is much greater than 1, greatly increasing the lipophilic performance of the inner surface of the acceleration chamber 51. Hexagonal prism micro-convex bodies used in this solution are evenly distributed on the surface per unit area of $L^2$, and the hexagonal prism micro-convex body has a side length c and a minimum height h. A height difference is Δh, an area occupation rate is η, a vertical center distance is b, and an angle between an upper surface of the micro-convex body 57 and the inner surface of the acceleration chamber 51 is β. In this case, a roughness factor r per unit area can be calculated as follows:

$$r = \frac{\frac{2L^2\eta}{3\sqrt{3}c^2}\left[6c\left(2h + \frac{\Delta hL}{b}\right) + \frac{3\sqrt{3}c^2}{2}\left(\frac{1}{\cos\beta} - 1\right)\right]}{L^2} \quad (15)$$

According to formula (15), setting of the area occupation rate η, the side length c, the height h, the height difference Δh, and the vertical center distance b of the micro-convex body can implement an active design of the roughness factor r.

The lipophilic performance of the inner surface of the acceleration chamber 51 can effectively absorb the minimal quantity lubrication liquid flowing out of the mixing chamber 50, to increase motion resistance of the minimal quantity lubrication liquid. The structure of the transitional micro-convex body can cause motion resistance of minimal quantity lubrication liquid to be distributed in descending order in the acceleration chamber 51, helping to form a uniform oil film under the pulling action of compressed air, and greatly reducing disturbance of the jet and improving the uniformity of the liquid line of the liquid film, thereby causing finally formed droplets to be distributed more evenly and motion paths thereof to be more controllable. The plurality of transitional micro-convex bodies 57 disposed on the inner surface of the acceleration chamber 51 also greatly increase a contact area between the nozzle core 45 and the minimal quantity lubrication liquid. Because of the better lipophilicity of the inner surface, time of contact between the minimal quantity lubrication liquid and the inner surface is greatly increased, providing more ideal charging performance.

The specific implementations of the present disclosure are described above with reference to the accompanying drawings, but are not intended to limit the protection scope of the present disclosure. Those skilled in the art should understand that various modifications or deformations may be made without creative efforts based on the technical solutions of the present disclosure, and such modifications or deformations shall fall within the protection scope of the present disclosure.

What is claimed is:

1. A contact-type electrostatic nozzle with a gradient micro-convex body, comprising: a nozzle core, an upper nozzle body being connected above the nozzle core; an empty space being formed between the upper nozzle body and the nozzle core for storing compressed air and decompression; a lower nozzle body being connected below the nozzle core; a gas-liquid mixing chamber, an acceleration chamber, and a nozzle outlet being sequentially disposed inside the nozzle core from top to bottom; and micro-convex bodies being evenly arranged on an inner wall of the acceleration chamber, and heights of the micro-convex bodies being non-equal-height to each other, that is, a height of each one of the micro-convex bodies each individually decreasing in height along a jet motion direction.

2. A minimal quantity lubricating and grinding system for a controllable jet, comprising:
the contact-type electrostatic nozzle with a gradient micro-convex body according to claim 1.

3. The minimal quantity lubricating and grinding system for a controllable jet according to claim 2, further comprising:
a grinding machine workbench, a grinding wheel being disposed above the grinding machine workbench, a grinding wheel cover being disposed outside the grinding wheel; a workpiece being disposed between the grinding machine workbench and the grinding wheel; a minimal quantity lubrication liquid delivery pipe being fixed on the grinding wheel cover, one end of the minimal quantity lubrication liquid delivery pipe being connected to the contact-type electrostatic nozzle, and the other end being connected to a minimal quantity lubrication device;
the electrostatic nozzle being further electrically connected to an adjustable high-voltage DC power supply, the adjustable high-voltage DC power supply being further electrically connected to a workpiece power-on device; and the workpiece power-on device being adsorbed on a non-processed surface of the workpiece, and the workpiece being connected to a positive electrode of the adjustable high-voltage DC power supply, so that the electrostatic nozzle is negative and a surface of the workpiece is positive, and an electric field is formed between the electrostatic nozzle and the workpiece to facilitate controllable delivery of minimal quantity lubrication droplets.

4. The minimal quantity lubricating and grinding system for a controllable jet according to claim 2, wherein a contraction angle α of an acceleration chamber is between 5-20°, a diameter of the nozzle outlet is B, a length of the nozzle outlet is L, and a value of L/B is from 2 to 6.

5. The minimal quantity lubricating and grinding system for a controllable jet according to claim 2, wherein the minimal quantity lubrication device comprises:
a precision minimal quantity lubrication pump, a liquid inlet of the precision minimal quantity lubrication pump being disposed on the precision minimal quantity lubrication pump, a liquid inlet of the precision minimal quantity lubrication pump being in communication with an insulating oil cup, the insulating oil cup being configured to supply liquid to the precision minimal quantity lubrication pump; the precision minimal quantity lubrication pump being further in communication with a liquid suction air path and an atomization air path, the liquid suction air path and the atomization air path being both in communication with a compressed air source; the liquid suction air path being configured to control the precision minimal quantity lubrication pump to suck minimal quantity lubrication liquid in the insulating oil cup; and the atomization air path being configured to deliver atomized minimal quantity lubrication liquid.

6. The minimal quantity lubricating and grinding system for a controllable jet according to claim 5, wherein one end of the atomization air path is connected to a first inlet port of the lubrication pump, and the other end of the atomization air path is connected to a first port of a three-way valve; one end of the liquid suction air path is connected to a second inlet port of the lubrication pump, and the other end of the liquid suction air path is connected to a second port of the three-way valve; and a third port of the three-way valve is connected to the compressed air source through a pipeline.

7. The minimal quantity lubricating and grinding system for a controllable jet according to claim 5, wherein a grinding machine workbench is covered with an insulating plate.

* * * * *